United States Patent [19]

Hasha

[11] 4,416,147

[45] Nov. 22, 1983

[54] APPARATUS AND METHOD FOR HYDROSTATICALLY TESTING PIPE

[76] Inventor: Brian B. Hasha, 17211 Ash Butte, Houston, Tex. 77090

[21] Appl. No.: 283,484

[22] Filed: Jul. 15, 1981

[51] Int. Cl.³ .............................................. G01M 3/28
[52] U.S. Cl. ....................................... 73/49.6; 73/49.4
[58] Field of Search ...................... 73/49.6, 49.5, 49.4, 73/49.8, 46

[56] References Cited

U.S. PATENT DOCUMENTS

| | | | |
|---|---|---|---|
| 131,405 | 9/1872 | McGown | 73/49.6 |
| 182,397 | 9/1876 | Wood | 73/49.6 |
| 225,529 | 3/1880 | Matheson | 73/49.6 |
| 1,373,824 | 4/1921 | McKenzie . | |
| 1,851,345 | 3/1932 | Brown et al. . | |
| 2,196,317 | 4/1940 | Longstreet . | |
| 2,231,807 | 2/1941 | Hybarger | 73/49.5 |
| 2,336,524 | 12/1943 | Bannister . | |
| 2,493,061 | 1/1950 | Devine et al. | 73/49.6 |
| 2,522,927 | 9/1950 | Camerota | 73/49.6 |
| 2,671,339 | 3/1954 | Krouse et al. | 73/49.6 |
| 2,683,982 | 7/1954 | Lassman et al. | 73/49.6 |
| 2,725,743 | 12/1955 | Reichl | 73/49.6 |
| 2,828,620 | 4/1958 | Franks . | |
| 2,883,859 | 4/1959 | Merrill | 73/49.6 |
| 2,895,328 | 7/1959 | Payne et al. | 73/49.6 |
| 2,896,445 | 7/1959 | McNabb | 73/49.6 |
| 2,907,202 | 10/1959 | McConnell . | |
| 3,001,802 | 9/1961 | Rebman et al. | 73/49.5 |
| 3,179,127 | 4/1965 | Terry . | |
| 3,312,103 | 4/1967 | Goeke | 73/49.6 |
| 3,350,920 | 11/1967 | Brauer . | |
| 3,350,921 | 11/1967 | Brauer et al. | 73/49.6 |
| 3,587,294 | 6/1971 | Kost | 73/49.5 |
| 3,760,632 | 9/1973 | Illyes et al. . | |
| 4,077,250 | 3/1978 | Wesch . | |
| 4,211,107 | 7/1980 | Sleeter et al. | 73/49.6 |
| 4,254,655 | 3/1981 | Keast | 73/49.5 |

Primary Examiner—Gerald Goldberg
Assistant Examiner—Joseph W. Roskos
Attorney, Agent, or Firm—Vinson & Elkins

[57] ABSTRACT

An apparatus and method for hydrostatically testing pipe is disclosed. Means are provided for externally exerting a force against test plugs sealing the ends of a pipe being tested to oppose forces tending to push the test plugs out of the ends of the pipe. Means are provided for controlling the amount of tension present in the pipe and, alternatively, for creating and maintaining a net compressive force on the pipe during the testing process in order to test characteristics of the pipe.

22 Claims, 21 Drawing Figures

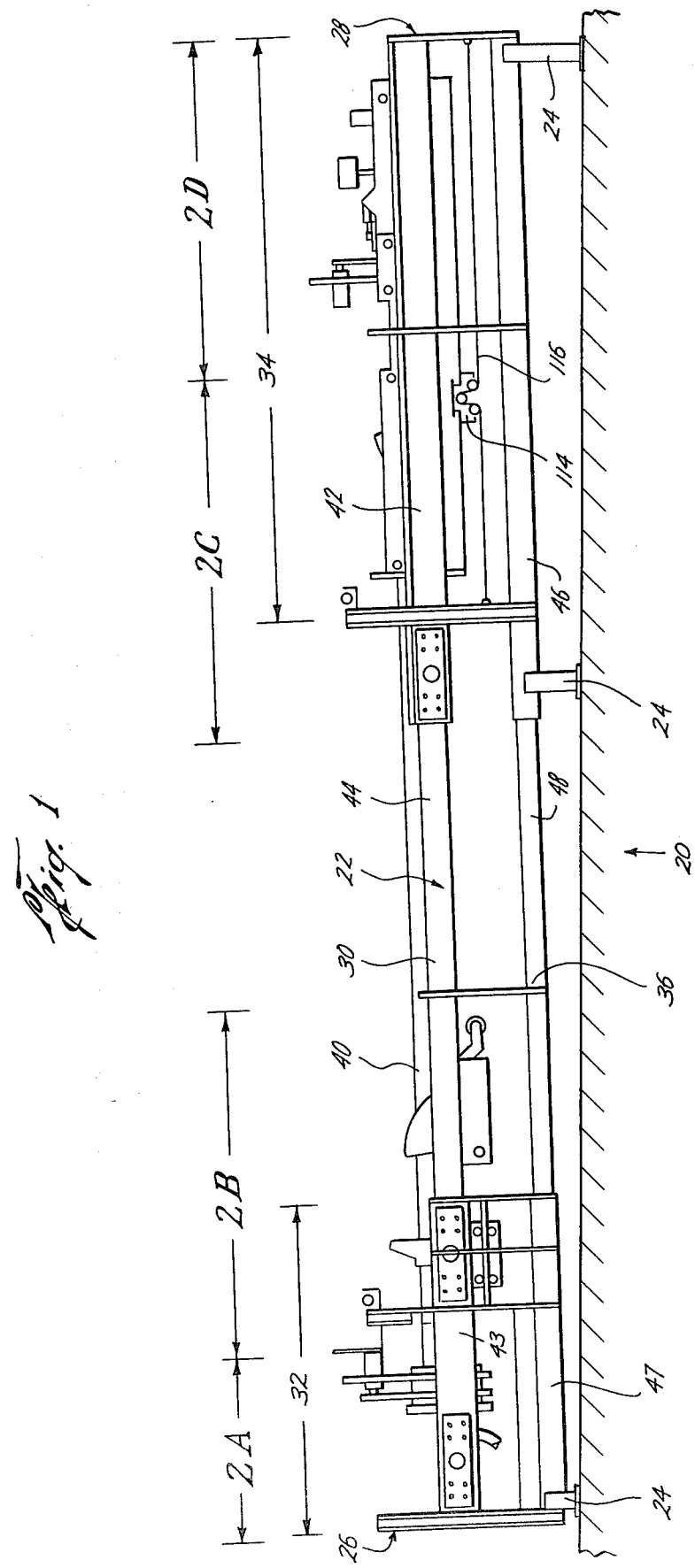

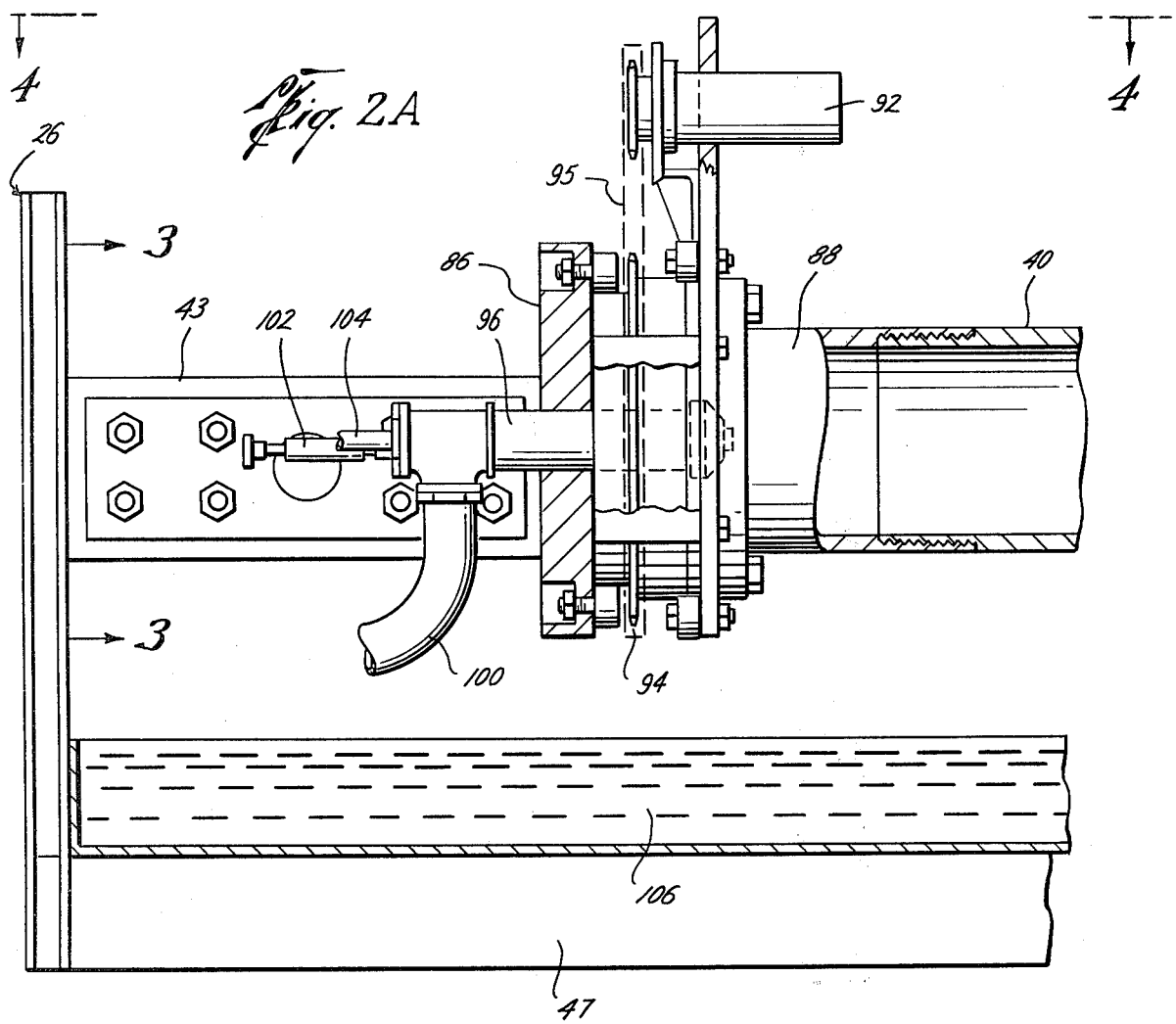
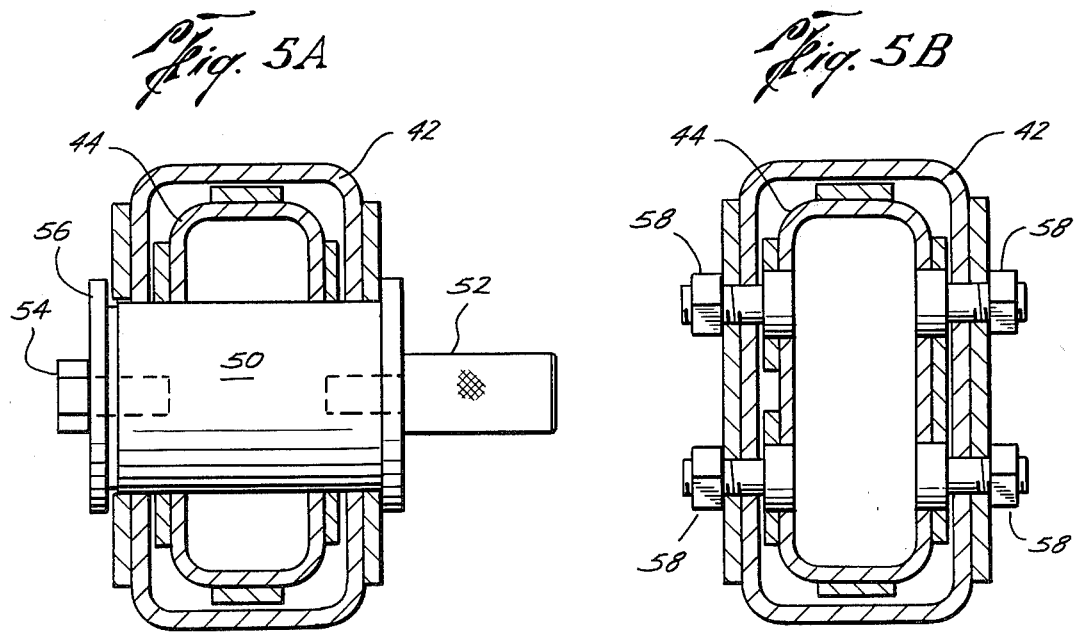

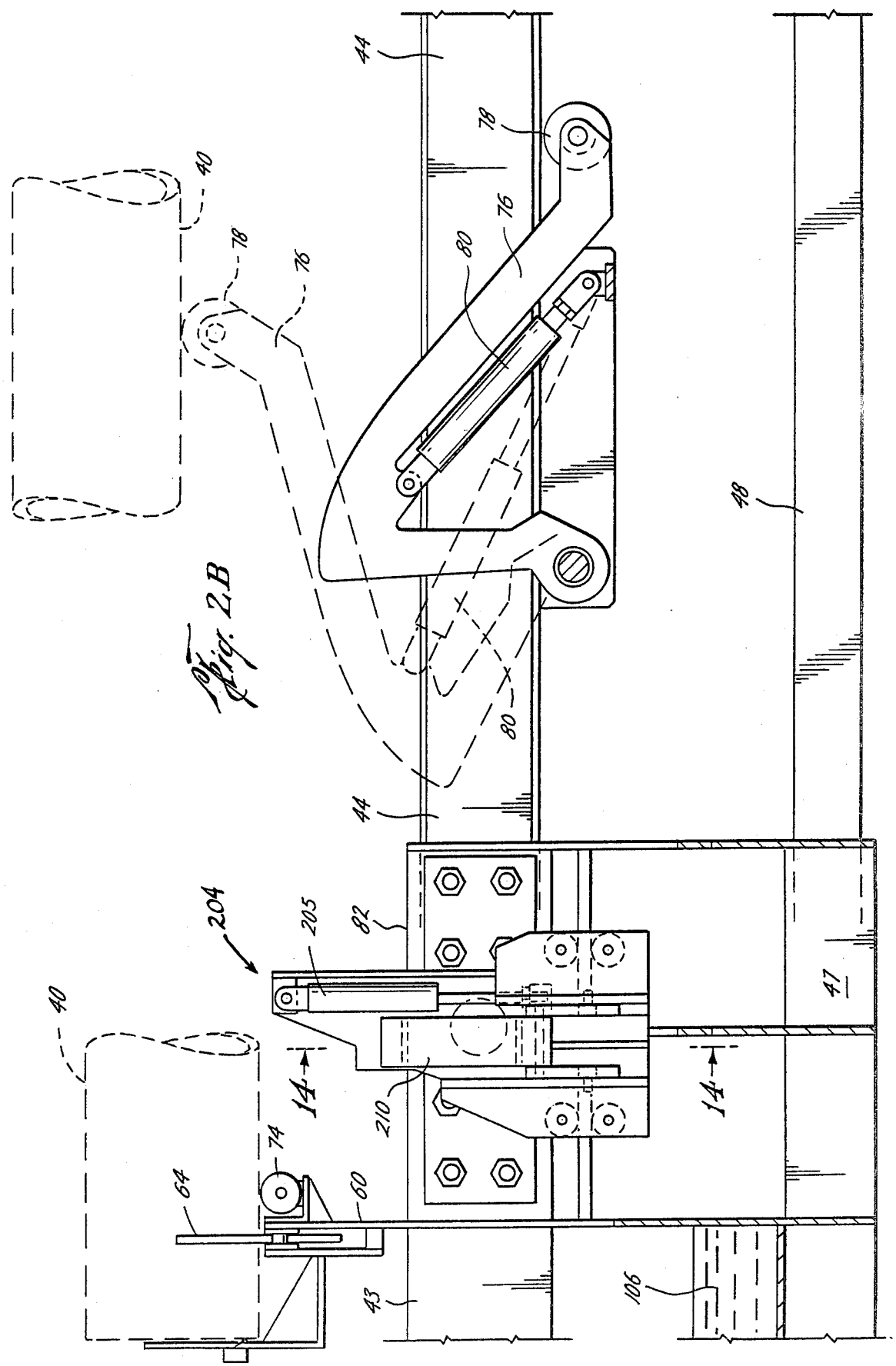

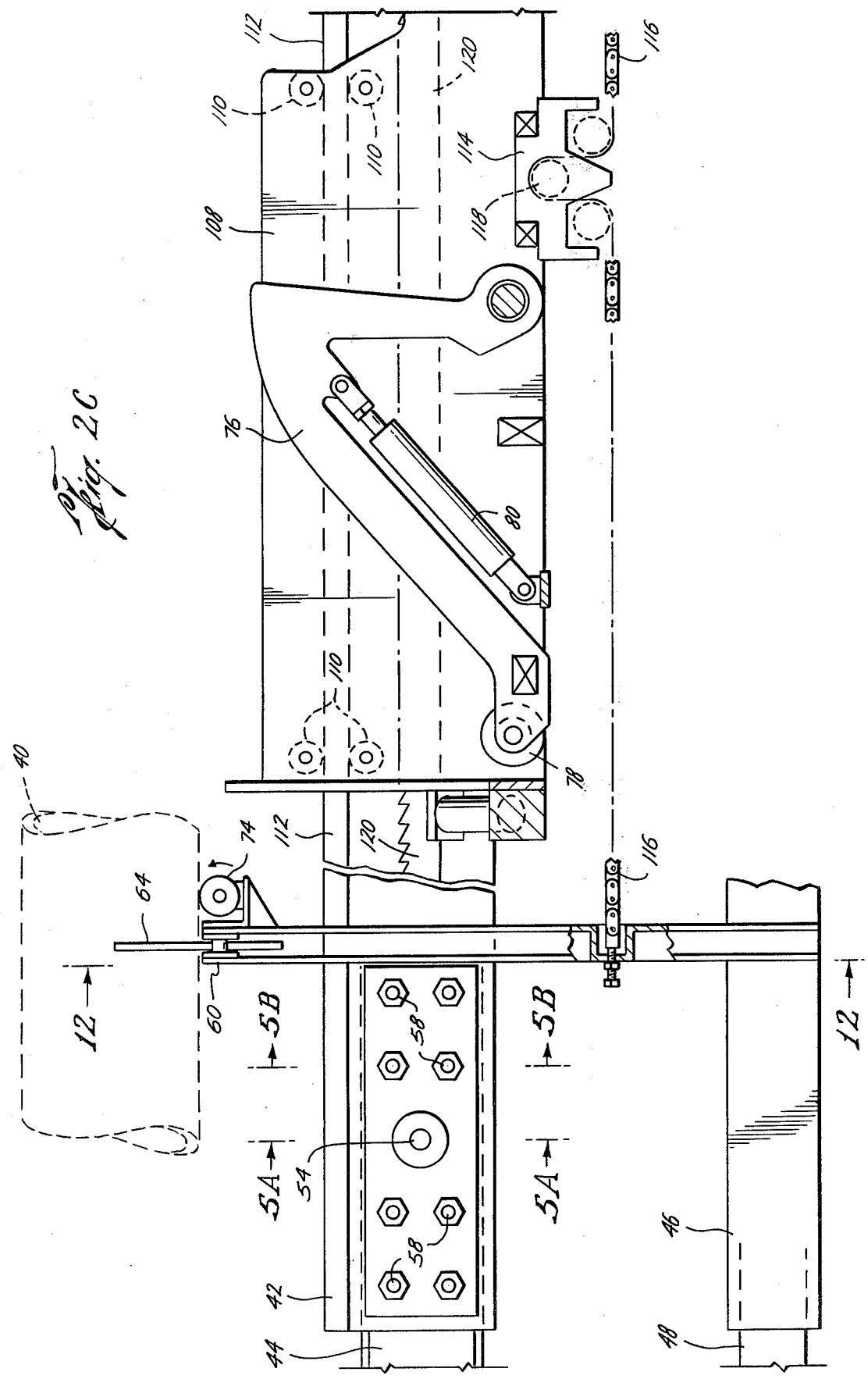

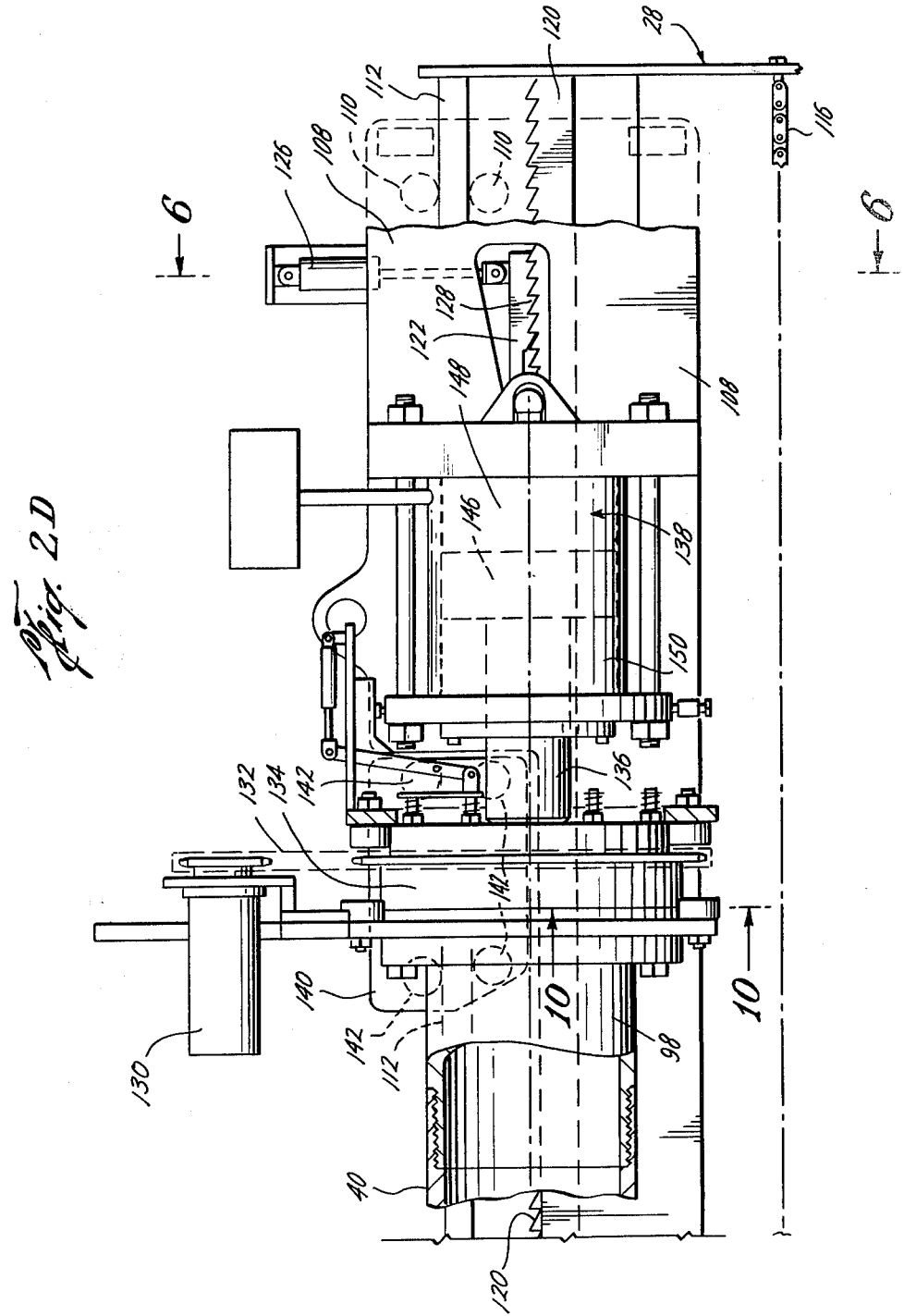

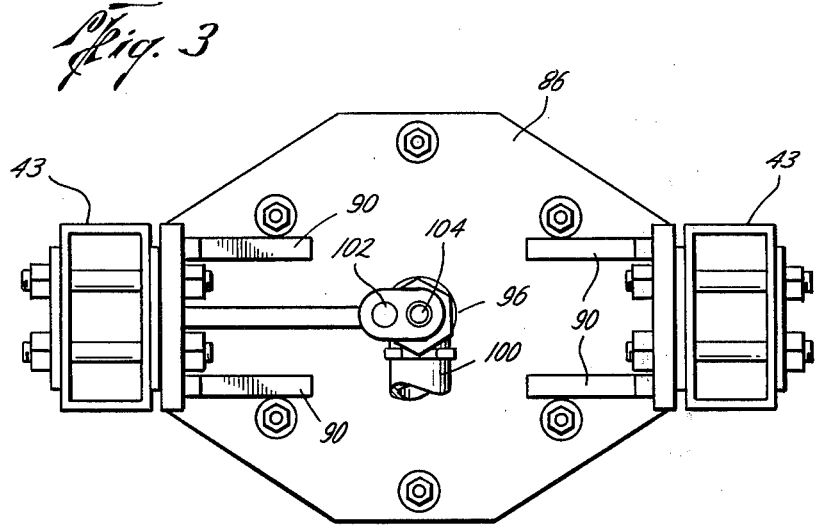
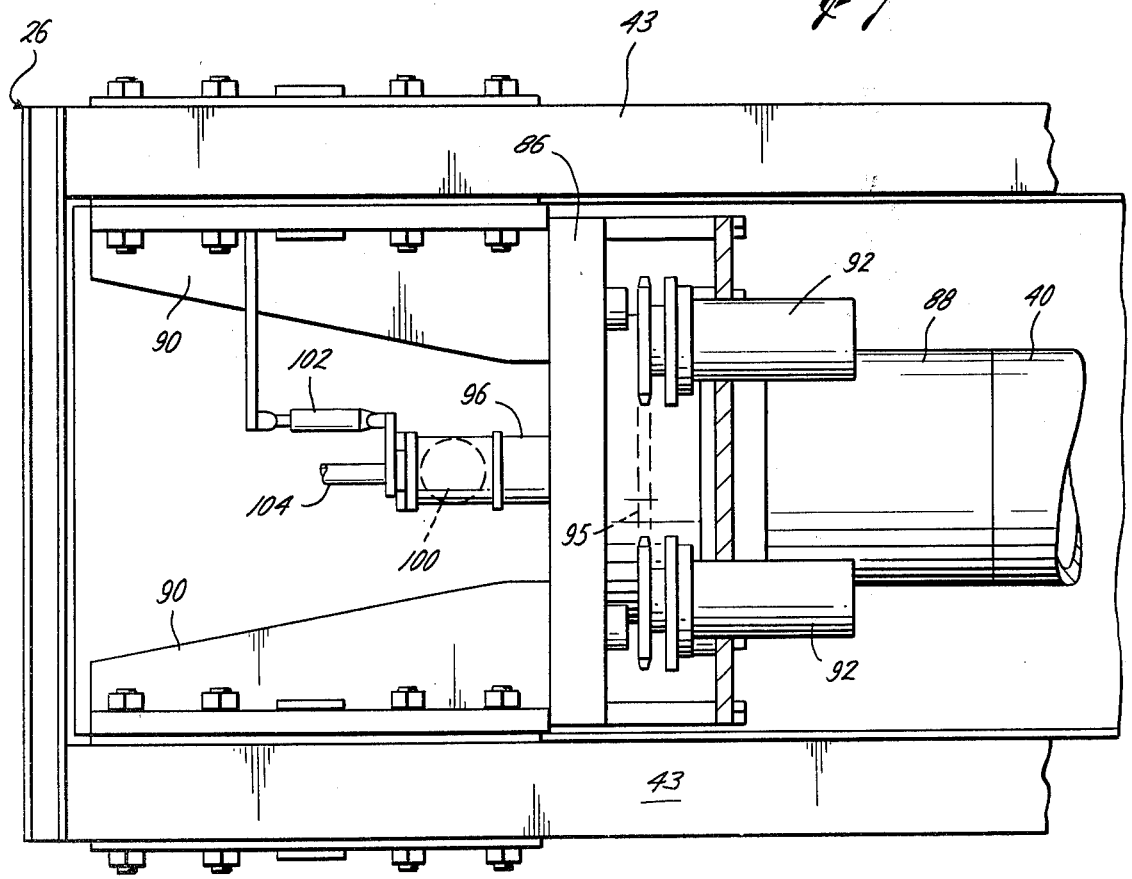

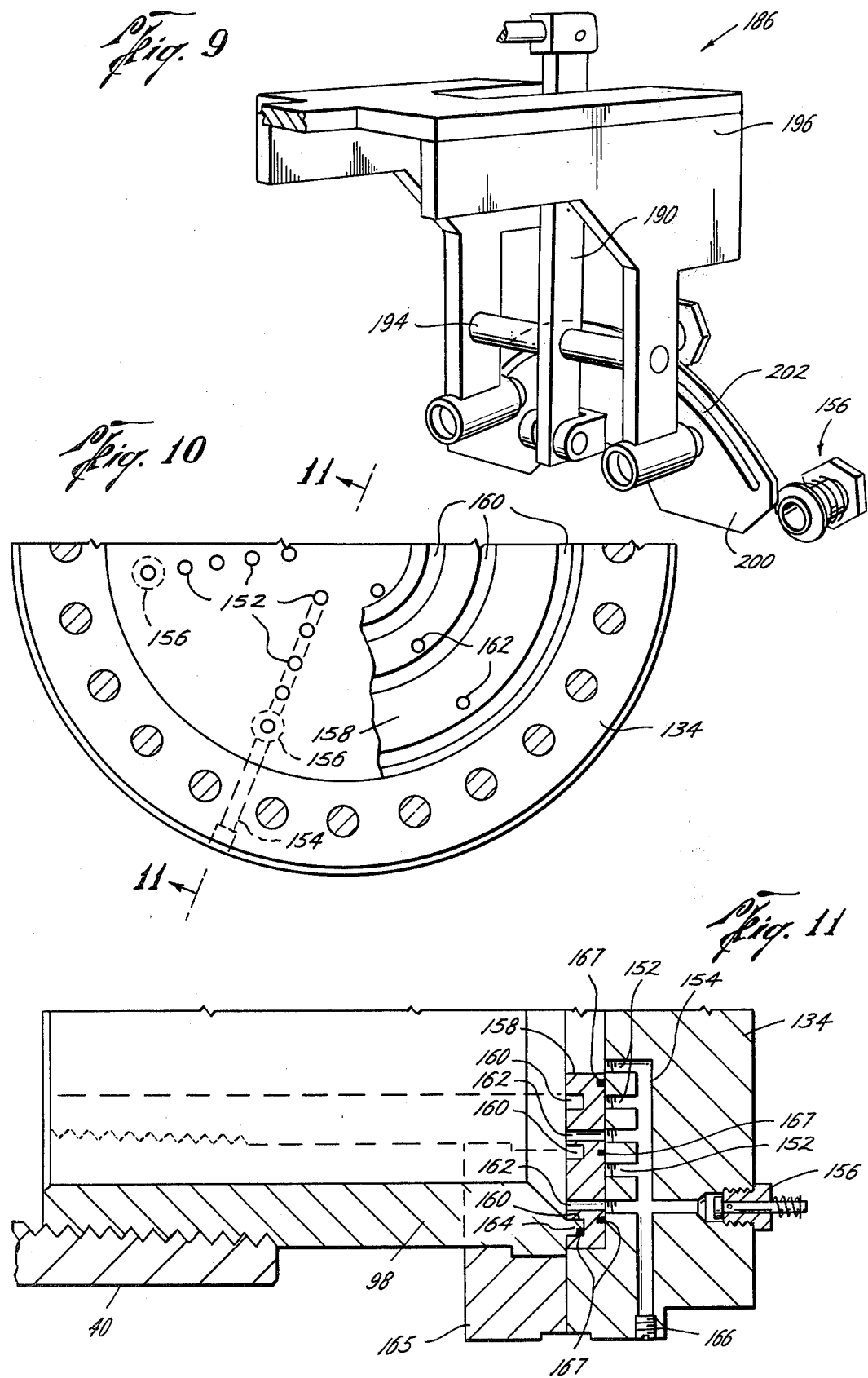

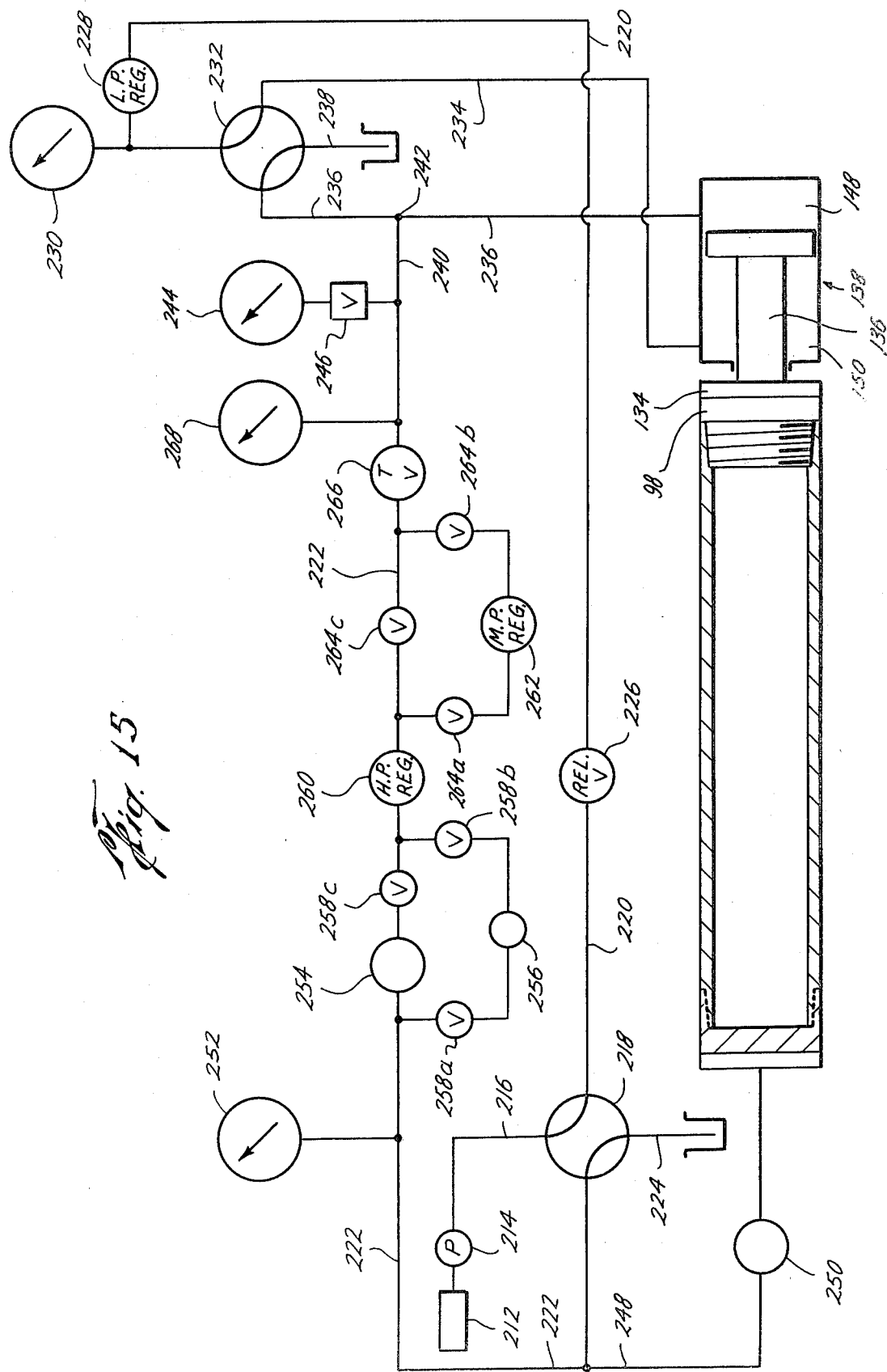

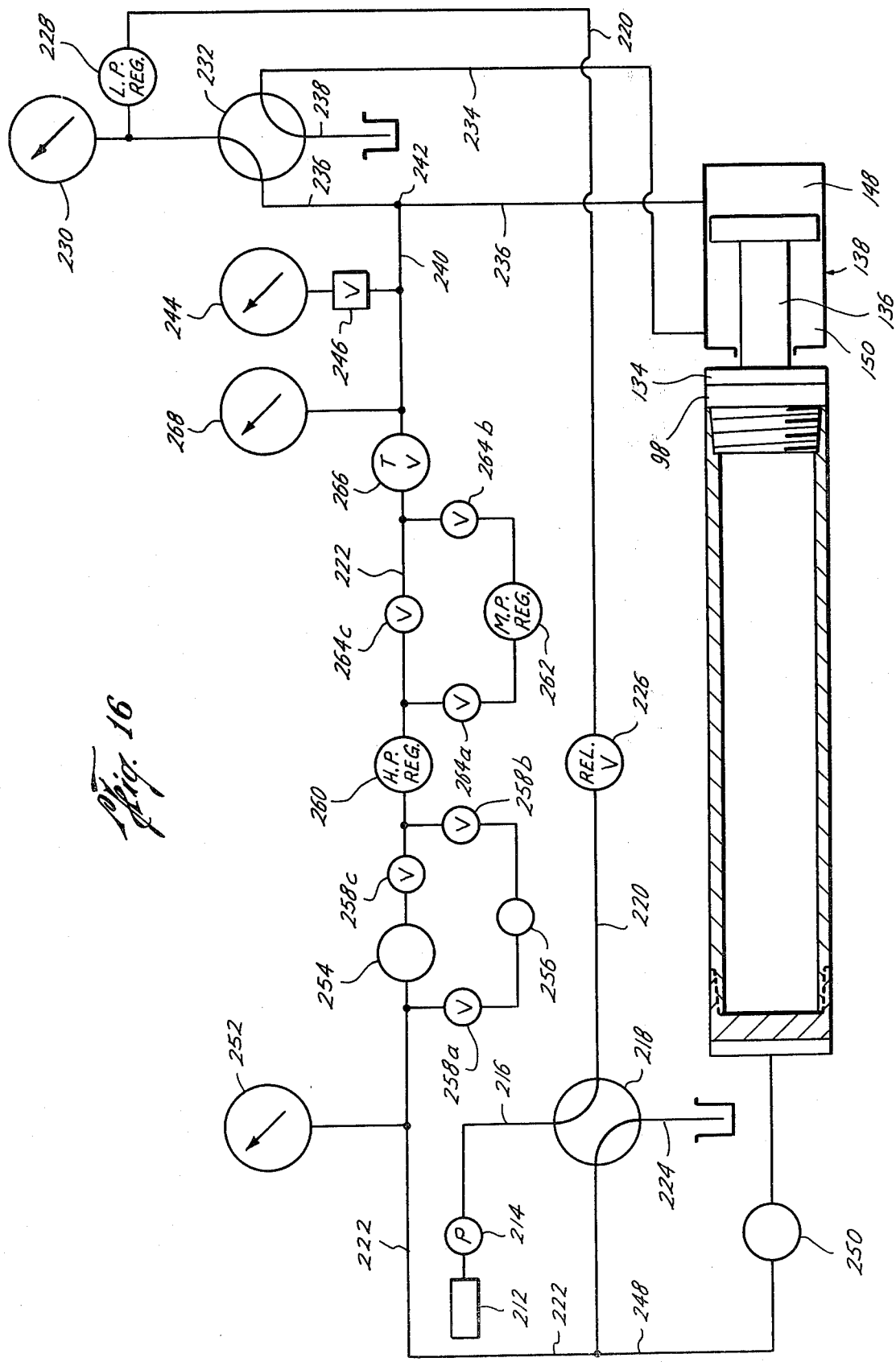

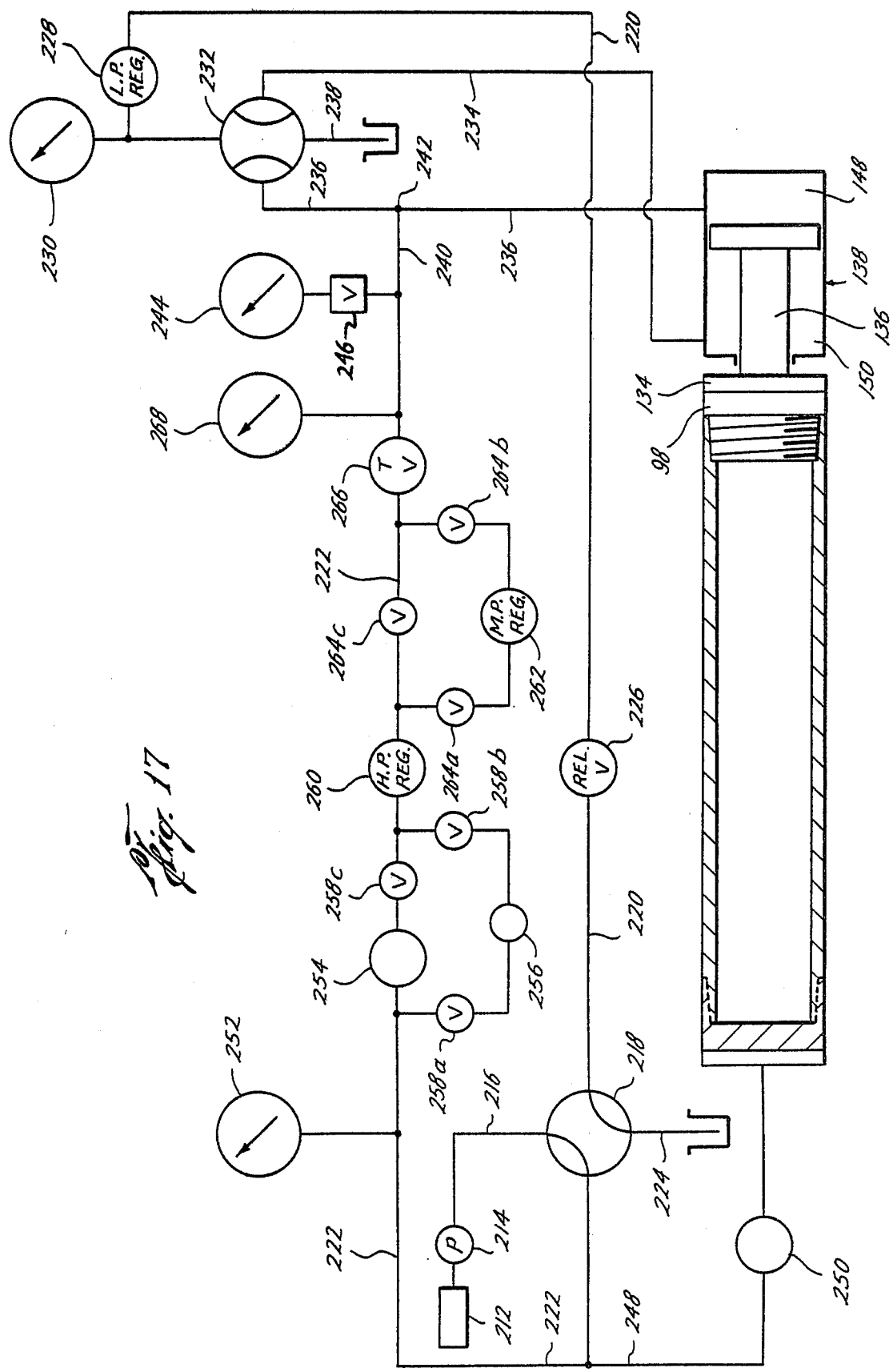

APPARATUS AND METHOD FOR HYDROSTATICALLY TESTING PIPE

This invention relates to the hydrostatic testing of pipe used in the oil and gas producing industry and, more particularly, to the hydrostatic testing of large diameter pipe such as well casing.

BACKGROUND OF THE INVENTION

The process of hydrostatically testing a length of pipe generally comprises fitting sealing devices into or around the ends of the pipe to be tested, admitting hydrostatic test fluid through an opening in one of the sealing devices, filling the pipe with hydrostatic test fluid, increasing the hydrostatic pressure on the test fluid to a predetermined value, checking the pipe for any cracks or structural irregularities through which the test fluid may be leaking under pressure, reducing the level of hydrostatic fluid pressure on the test fluid in the pipe after the test has been completed and removing the hydrostatic test fluid from the pipe.

While many types of hydrostatic pipe testing apparatus exist in the prior art, few of these are designed to safely and effectively test large diameter pipe such as casing. The basic problem to be solved in the hydrostatic testing of large diameter pipe is that the fluid pressures to which the interior of the pipe must be subjected exert great forces on the sealing devices which are used to seal the ends of the pipe. For example, the force on a sealing device which seals the end of a thirteen inch (13") diameter casing is approximately 400,000 lbs. when the test pressure is approximately 3,000 lbs. per square inch.

Although the invention is capable of testing both threaded pipe and non-threaded pipe, the description of the invention will be primarily directed to the mode of operation for testing threaded pipe. A threaded test plug is the sealing device most commonly used to seal threaded pipe. Because threaded pipe has both male and female ends, two types of threaded plugs are required to seal a threaded pipe. Specifically, a female threaded test plug must be provided to thread onto the male end of the threaded pipe and a male threaded test plug must be provided to thread into the female end of threaded pipe.

The magnitude of the forces involved in testing large diameter pipe may cause a threaded test plug to be blown from the end of the pipe if there is a structural failure of the threads of the pipe onto which the test plug is threaded. A test plug may also be blown from the end of the pipe if there is a structural failure of the threads of the test plug or if the test plug is improperly threaded into or onto the end of the pipe to be tested.

Because of the large forces involved it has generally been conceded that such a high pressure failure could not be prevented. Accordingly, prior art attempts to solve the problem have been directed toward catching the test plugs once they have been blown from the end of the pipe. In contradistinction, the present invention comprises an apparatus and method for providing sufficient restraining force to prevent the test plugs from being suddenly blown from the ends of the pipe during a high pressure test failure.

Of course, very large or massive backstops or retaining walls could be constructed between which the pipe could be wedged in order to securely hold the test plugs on or within the ends of the pipe. The backstops or retaining walls would be designed to have sufficient strength to withstand the enormous forces acting on the test plugs. One disadvantage of such a design is that the pipe testing apparatus would not be easily portable due to the mass and size of the necessary backstops or retaining walls. The design of the present invention, however, provides a relatively lighweight and easily portable structure capable of counteracting the large forces tending to push the test plugs out of the end of the pipe being tested.

SUMMARY OF THE INVENTION

The hydrostatic pipe testing apparatus of the present invention is designed to operate in conjunction with a longitudinally extending frame upon and within which the pipe to be tested is placed and secured during testing. The frame may be constructed so that the length of the frame may be extended or contracted to accommodate pipes of varying lengths and so that the length of the frame may be shortened when it is desired to transport the apparatus.

After the frame has been adjusted to accommodate a particular range of lengths of pipe, the pipe to be tested is secured longitudinally within the frame. The two ends of the pipe are then sealed with test plugs and hydrostatic test fluid is then introduced into the interior of the pipe through one of the test plugs sealing the ends of the pipe. The hydrostatic test fluid within the pipe is then subjected to high levels of fluid pressure to test the pipe.

The invention provides an apparatus and method for controlling the amount of force transmitted from the sealed ends of the pipe to the frame during the hydrostatic testing process. The invention also provides an apparatus and method for varying the tension on the pipe, and alternatively, for creating and maintaining a net compressive force on the pipe during the hydrostatic testing process.

In the preferred embodiment of the invention a hydraulically operated compression cylinder with an associated hydraulic system is located within a longitudinally movable carriage mounted on the one end of the frame. The compression cylinder is located immediately adjacent to and behind a test plug mounted on the carriage. A longitudinally movable piston mounted within the compression cylinder abuts the back of the test plug mounting. The hydrostatic fluid within the compression cylinder which actuates the piston may be subjected to the same high level of hydrostatic pressure as the hydrostatic test fluid within the pipe during high pressure testing.

The hydrostatic system controlling the compression cylinder automatically adjusts the hydrostatic pressure of the hydrostatic fluid in the compression cylinder in response to the hydrostatic fluid pressure exerted on the test plugs from within the pipe during high pressure testing. The high pressure hydrostatic fluid in the compression cylinder acts as a high pressure fluid buffer for balancing the high pressure exerted by the hydrostatic test fluid within the pipe. Because the hydrostatic test fluid in the pipe is in fluid communication with the hydrostatic fluid in the compression cylinder via the hydraulic system, the hydraulic system regulates the compression cylinder to control the amount of force transmitted from the test plugs to the frame during high pressure testing of the pipe. The fluid pressure buffering action of the compression cylinder provides means for controlling a high pressure test failure.

By varying the hydrostatic pressure within the compression cylinder to adjust the force exerted by the compression cylinder piston on the pipe, one can vary the amount of tension experienced by the pipe during the testing process in order to test, for example, the burst capacity of the pipe. The apparatus and method of the invention may also be used to create and maintain a net compressive force on the pipe during the testing process by increasing the force exerted by the compression cylinder on the pipe until said force is greater than the tension on the pipe due to the internal test pressure within the pipe during the testing process.

The apparatus and method of the invention may also be used to test plain end pipe by utilizing test plugs that are adapted to sealingly engage plain end pipe.

An object of the invention is to provide an apparatus and method for hydrostatically testing pipe used in the oil and gas producing industry and, more particularly, for hydrostatically testing large diameter pipe such as well casing.

Another object of the invention is to provide an apparatus and method for preventing the uncontrolled explosion of sealing devices from the ends of pipe during high pressure hydrostatic testing of said pipe. Yet a further object of the invention is to provide an apparatus and method for hydraulically buffering the hydrostatic pressure within the interior of a pipe being hydrostatically tested so that increases in said hydrostatic pressure beyond a safe level may be gradually and harmlessly released.

Another object of the invention is to provide an apparatus and method for hydraulically buffering the hydrostatic pressure within the interior of a pipe being hydrostatically tested so that a pipe being tested may increase or decrease in length during the testing process without binding or undergoing stress due to interaction with the frame containing the pipe.

Another object of the invention is to provide an apparatus and method for varying the amount of tension on a pipe being hydrostatically tested in order to test one or more characteristics of the pipe.

Another object of the invention is to provide an apparatus and method for creating and maintaining a net compressive force on a pipe being hydrostatically tested in order to test one or more characteristics of the pipe.

Still another object of the invention is to provide a relatively lightweight and easily portable apparatus for hydrostatically testing pipe and for preventing high pressure test failures that may occur during the hydrostatic testing of large diameter pipe.

Other objects and advantages of the invention will become apparent from a consideration of the detailed description and the drawings.

BRIEF DESCRIPTION OF THE DRAWINGS

FIG. 1 is a side view of the apparatus of the invention;

FIG. 2A is a partially sectional side view of the front end of the apparatus showing a rotatably mounted test plug for engaging the end of a threaded pipe and showing a fill valve for filling the pipe with test fluid;

FIG. 2B is a partially sectional side view of a section of the apparatus showing a vise for securing a pipe to the apparatus and showing a hydraulically actuated arm for lowering a pipe onto or lifting a pipe from the apparatus;

FIG. 2C is a partially sectional side view of a section of the apparatus showing a portion of a movable carriage mounted on the apparatus having a hydraulically actuated arm for lowering a pipe onto or lifting a pipe from the apparatus and having a motor driven chain assembly for moving the movable carriage of the apparatus;

FIG. 2D is a partially sectional side view of the rear end of the apparatus showing a portion of a movable carriage mounted on the apparatus having a rotatably mounted test plug for engaging the end of a threaded pipe and having a compression cylinder with a movable piston for buffering the hydrostatic pressures exerted on said test plug by the test fluid within a pipe being hydrostatically tested;

FIG. 3 is an end view of the back plate of the test plug assembly mounted on the front end of the apparatus taken along line 3—3 of FIG. 2A showing a fill valve extending through an aperture through said back plate through which the fill valve fills the pipe with test fluid;

FIG. 4 is a top view of the front end of the apparatus taken along line 4—4 of FIG. 2A;

FIG. 5A is a sectional view taken along line 5A of FIG. 2C showing a large diameter fastening pin for securing the telescoping leg sections of the apparatus;

FIG. 5B is a sectional view taken along line 5B of FIG. 2C showing a plurality of bolts for securing the telescoping leg sections of the apparatus;

FIG. 9 is a perspective view of the housing and linkage mechanism for opening and closing the air bleed valve shown in FIG. 2D;

FIG. 10 is a partially sectional view taken along line 10—10 of FIG. 2D showing the construction of the back plate of the test plug mounted on one end of the apparatus;

FIG. 11 is a cross sectional view taken along line 11—11 of FIG. 10 showing the internal construction of the back plate shown in FIG. 10 and the manner in which it seats against the end of the pipe to be tested;

FIG. 15 is a schematic diagram of the hydraulic system of the apparatus showing a configuration of the hydraulic system for causing the piston in the compression cylinder to move toward the back of the compression cylinder;

FIG. 16 is a schematic diagram of the hydraulic system of the apparatus showing a configuration of the hydraulic system for causing the piston in the compression cylinder to move toward the front of the compression cylinder; and FIG. 17 is a schematic diagram of the hydraulic system of the apparatus showing the configuration of the hydraulic system during the high pressure testing of a pipe.

DESCRIPTION OF THE PREFERRED EMBODIMENT

Figure 6:
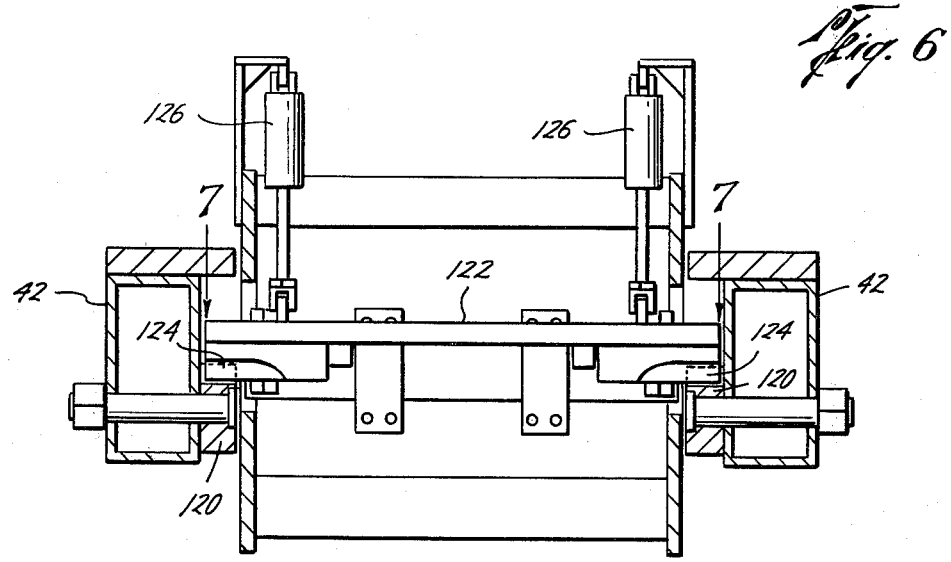
FIG. 6 is a sectional view of a portion of the front end of the apparatus on the line 6—6 of FIG. 2D showing a hydraulically operated locking mechanism for securing a movable carriage mounted on the apparatus into a fixed position with respect to the apparatus.

The hydrostatic pipe testing apparatus of the present invention is generally denoted by the numeral 20 and is schematically depicted in FIG. 1. The hydrostatic pipe testing apparatus 20 generally comprises a frame 22 which rests upon and is supported by stationary supports 24. Although the preferred embodiment of the invention rests upon stationary supports 24, it may be appreciated that the frame 22 may readily be mounted upon wheels (not shown) to permit the hydrostatic pipe testing apparatus 20 to be easily transported to convenient testing locations.

As a matter of convenience in describing the apparatus, the end of the frame 22 generally denoted by the numeral 26 will be referred to as the front end of the frame and the end of the frame 22 generally denoted by the numeral 28 will be referred to as the rear end of the frame. Frame 22 generally comprises a set of two longitudinally extending telescoping legs 30 disposed and fixed parallel to each other by a front end section 32 of frame 22 and by a rear end section 34 of frame 22. A second set of two longitudinally extending auxiliary telescoping legs 36 are disposed and fixed parallel to each other and parallel to telescoping legs 30. Auxiliary telescoping legs 36 are located beneath telescoping legs 30 and are secured within front end section 32 and rear end section 34 of frame 22 as are telescoping legs 30. Thus, frame 22 generally possesses a rectangular shape as shown in FIG. 1. During the testing process, the pipe 40 to be tested is disposed and fixed parallel to and between the two telescoping legs 30.

Each telescoping leg 30 is composed of a rear leg section 42, a front leg section 43 and a middle leg section 44. Each rear leg section 42 and each front leg section 43 is hollow for slidably receiving an end of a middle leg section 44. Similarly, each auxiliary telescoping leg 36 is composed of a rear auxiliary leg section 46, a front auxiliary leg section 47 and an auxiliary middle leg section 48. Each rear auxiliary leg section 46 and each front auxiliary leg section 47 is hollow for slidably receiving an end of an auxiliary middle leg section 48. Two middle leg sections 44 and two auxiliary middle leg sections 48 are thus slidably disposed within the front end section 32 and within the rear end section 34 of frame 22.

The two rear leg sections 42 and the two rear auxiliary leg sections 46 compose the rear end section 34 of frame 22. The two front leg sections 43 and the two front auxiliary leg sections 47 compose the front end section 34 of frame 22. Thus, it may be seen that the two middle leg sections 44 and the two auxiliary middle leg sections 48 compose a portion of frame 22 which may be slidably moved in a telescoping fashion either into or out of rear end section 34 of frame 22 or either into or out of front end section 32 of frame 22. The relative sliding or telescoping of the portions of frame 22 may be mechanically effected by any of a number of conventional means.

To prepare the apparatus for testing pipe having a length within a particular range of lengths, the frame 22 must first be telescopically adjusted to the appropriate length. Then, the two middle leg sections 44 must be locked into engagement with their respective rear leg sections 42 and with their respective front leg sections 43 to make frame 22 rigid throughout the hydrostatic testing process. In the preferred embodiment of the apparatus it is not necessary to similarly secure the auxiliary telescoping legs 36. The strength of the coupling between the rear leg sections 42 and the middle leg sections 44 of the telescoping legs 30 and the strength of the coupling between the front leg sections 43 and the middle leg sections 44 of the telescoping legs 30 is great enough to obviate the necessity for securing the auxiliary telescoping legs 36.

In the preferred embodiment of the apparatus each middle leg section 44 and each leg section 42 is formed having a plurality of apertures passing transversely through each of the middle leg sections 44 and through each of the leg sections 42. As shown in FIG. 2C and in FIGS. 5A and 5B, the apertures are located so that they may be aligned to permit fastening means to pass through the apertures and secure each middle leg section 44 with respect to its corresponding leg section 42. The preferred embodiment of the apparatus employs a large metal cylindrically shaped fastening pin 50 for coupling the leg sections 42 and 44. A handle 52 facilitates the placement and removal of fastening pin 50 during the fastening or unfastening process. Fastening pin bolt 54 and flange 56 secure fastening pin 50 in place. A plurality of reinforcing bolts 58 positioned on both sides of fastening pin 50 and extending through leg sections 42 and 44 provide leg sections 42 and 44 in case fastening pin 50 fails.

As shown in FIGS. 1 and 2B, an identical fastening system is employed to secure the middle leg sections 44 to the front leg sections 43 of front end section 32 of frame 22. As shown in FIGS. 1, 2A, 3 and 4, an identical fastening system is employed to rigidly secure the front leg sections 43 of front end section 32 of frame 22 to the front end 26 of frame 22 via force flanges 90.

It should be noted that the rear leg sections 42 of the telescoping legs 30 are not rigidly secured to the rear end 28 of frame 22. Instead, the ends of rear leg sections 42 are merely slidably disposed with correspondingly shaped apertures (not shown) in the rear end 28 of frame 22. Rear end 28 of frame 22 serves as supporting member for supporting the rear ends of the telescoping legs 30 and the hydraulic system for hydrostatically testing the pipe 40. This feature of the construction insures that no loading on telescoping legs 30 due to the hydrostatic testing process will be transmitted to rear end 28 of frame 22 or to the auxiliary telescoping legs 36.

As previously mentioned, it is possible to use rigid nontelescoping legs in the frame. It is important to recognize that the apparatus and method of the invention is not limited to use in a pipe testing frame having telescoping legs.

Figure 12:
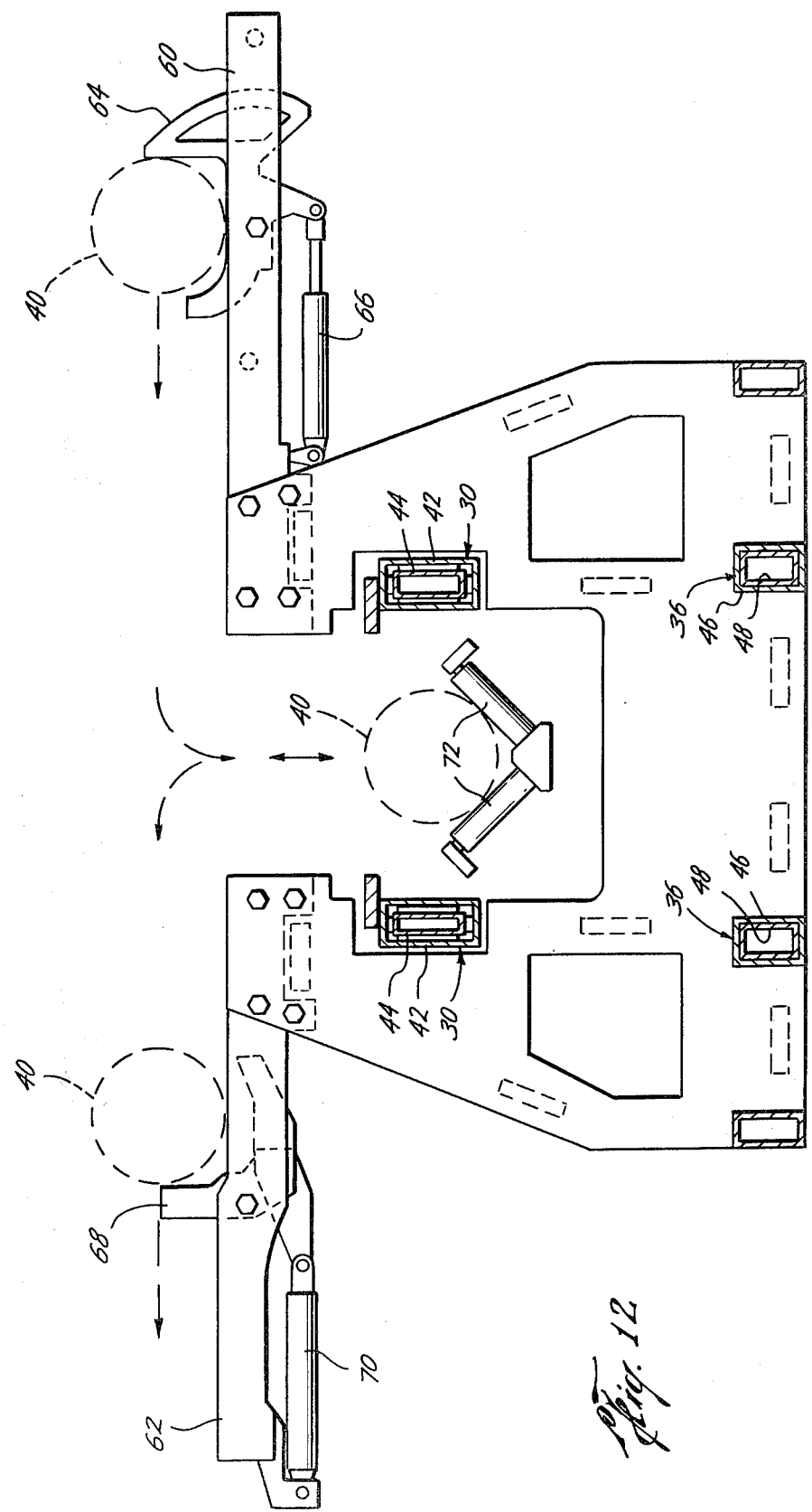
FIG. 12 is a sectional view taken along line 12—12 of FIG. 2C showing a section of the apparatus having hydraulically operated arms for moving the pipe into and out of test position within the apparatus.

The pipe 40 to be tested is moved into testing position within pipe testing apparatus 20 in the following manner. Initially, pipe 40 rests upon horizontally disposed pipe delivery arms 60 rigidly mounted upon pipe testing apparatus 20. FIG. 12 shows the manner in which a pipe delivery arm 60 extends outwardly from pipe testing apparatus 20. The pipe delivery arms 60 are affixed to pipe testing apparatus 20 approximately perpendicular to the axis of frame 22. Similarly, two pipe retrieval arms 62 are mounted on frame 22 immediately opposite pipe delivery arms 60. Pipe retrieval arms 62 receive and remove pipe 40 from the apparatus 20 after testing. The two pipe delivery arms 60 are rigidly mounted on frame 22 sufficiently far apart to permit pipe 40 to rest on said pipe delivery arms 60 in a stable position. Pipe retrieval arms 62 are similarly located.

As shown in FIG. 12, a pivotally mounted pipe selector 64 is actuated by hydraulic cylinder 66 to permit only one pipe 40 at a time to roll along pipe delivery arms 60 to the center of pipe testing apparatus 20. A pipe selector 64 is mounted on each of the two pipe delivery arms 60. FIGS. 2B and 2C show the location on frame 22 of the pipe delivery arms 60 and their associated pipe selectors 64. Pipe positioning rollers 74 mounted on pipe delivery arms 60 permit the pipe 49 to be longitudinally positioned on pipe delivery arms 60. Similarly, each pipe retrieval arm 62 is equipped with a pivotally mounted pipe retriever 68 actuated by a hydraulic cylinder 70. Pipe retrievers 68 prevent a pipe 40 that has just been tested from prematurely rolling away from pipe testing apparatus 20 along pipe retrieval arms 62.

Figure 13:
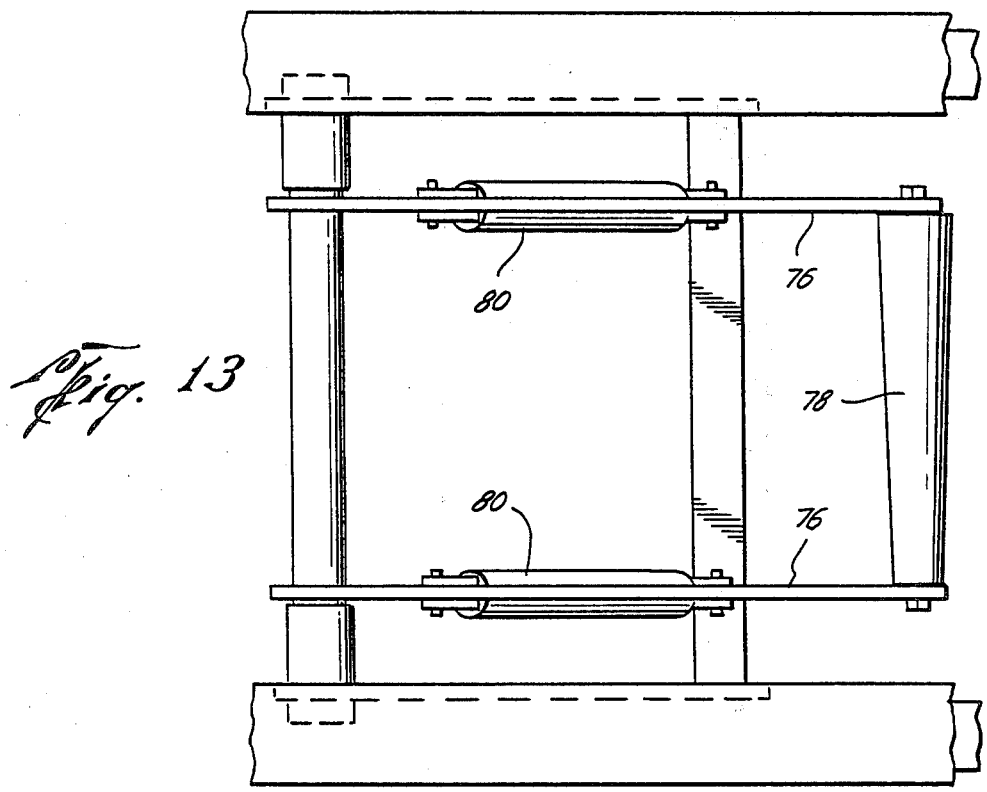
FIG. 13 is a plan view of one of the pipe lift arm assemblies shown in FIGS. 2B and 2C.

FIG. 12 also shows the location of pipe 40 within pipe testing apparatus 20 during the testing process. In the test position pipe 40 rests between the two parallel telescoping legs 30 and rests upon a plurality of support rollers 72 located along the axis of frame 22. To reach the test position pipe 40 rolls along pipe delivery arms 60 to the center of pipe testing apparatus 20. As shown in FIGS. 2B, 2C and 13 the pipe testing apparatus 20 is provided with two sets of pivotally mounted pipe lift arms 76 which horizontally support a pipe lift roller 78. The pipe lift arms 76 and pipe lift roller 78 are actuated by hydraulic cylinders 80. As shown in dotted outline in FIG. 2B, pipe lift arms 76 are in raised position when pipe 40 rolls from pipe delivery arms 60 to the center of pipe testing apparatus 20. Pipe 40 comes to rest upon and is supported by pipe lift roller 78. Of course, the pipe lift arm assembly shown in FIG. 2B is operated in conjunction with the pipe lift arm assembly shown in FIG. 2C. The two pipe lift arm assemblies simultaneously operate to either raise or lower the pipe 40 as desired. Once pipe 40 has been positioned on pipe lift rollers 78, the hydraulic cylinders 80 cause pipe lift arms 76 to lower pipe 40 into testing position. After pipe 40 has been hydrostatically tested, hydraulic cylinders 80 lift pipe lift arms 76 to cause pipe 40 to be lifted to the level of pipe retrieval arms 62 for removal as previously described.

Turning now to the front end section 32 of frame 22, one sees that, as previously described, front end section 32 comprises two substantially parallel front leg sections 43 and two substantially parallel front auxiliary leg sections 47 connected to and supported by the front end 26 of frame 22. Each front leg section 43 is hollow and has the appropriate inner dimensions to receive its respective middle leg section 44 of telescoping leg 30.

As shown in FIG. 2B, each front auxiliary leg section 47 is hollow and has the appropriate inner dimensions to receive its respective auxiliary middle leg section 48 of the auxiliary telescoping legs 36. As previously mentioned, each auxiliary middle leg section 48 rests within but is not fixedly connected to its respective front auxiliary leg section 47.

As shown in FIGS. 3 and 4, the two substantially parallel front leg sections 43 of front end section 32 have mounted between them a transversely positioned front test plug back plate 86. The principal functions of front test plug back plate 86 are to support front test plug 88 and its associated hydraulic system and to transmit the forces acting on front test plug 88 during the testing process to the front leg sections 43 of front end section 32. To facilitate the transmission of force from front test plug back plate 86 to front leg sections 43, four force flanges 90 are provided and connected as shown in FIGS. 3 and 4. The tapered shape of force flanges 90 smoothly channel and direct the forces acting on front test plug back plate 86 to the front leg sections 43.

When pipe 40 is in position to be tested, the threads of the male end of pipe 40 are resting just inside the interiorly threaded portion of test plug 88. Front test plug motors 92 are provided to rotate test plug 88 in either a clockwise or counterclockwise direction. Front test plug motors 92 may rotate front test plug gear 94 via a conventional gear driven drive chain 95 (shown in dotted outline). In preparing pipe 40 to be tested, front test plug motors 92 cause rotatably mounted front test plug 88 to be rotated until the male end of pipe 40 is threaded into the complementarily shaped female portion of front test plug 88. After the testing process has been completed, front end test plug motors 92 reverse direction to cause front test plug 88 to be rotated in the opposite direction, thereby uncoupling pipe 40 from its threaded connection.

As shown in FIGS. 2A, 3 and 4, front test plug back plate 86 is formed with an aperture passing completely through its central portion, said aperture being designed to permit a hydraulic fill valve 96 to have access to the interior portion of pipe 40 during the testing process. When pipe 40 has been securely threaded into front test plug 88 and has been securely threaded into rear test plug 98 (as will be later described), hydrostatic fill valve 96 opens to permit hydrostatic test fluid, usually water, to be admitted into the interior of pipe 40. The apparatus of hydrostatic fill valve 96 and its operating mechanism are described and claimed in U.S. Pat. No. 4,254,655, which is incorporated herein by reference for all purposes.

Hydrostatic fill valve 96 initially fills pipe 40 with hydrostatic test fluid under low pressure. In the preferred embodiment of the apparatus, the test fluid under low pressure enters hydrostatic fill valve 96 through low pressure test fluid conduit 100 as shown in FIGS. 2A, 3 and 4. After pipe 40 has been filled with test fluid, hydraulic cylinder 102 is actuated to cause hydrostatic fill valve 96 to seal pipe 40 from the further entry of test fluid into pipe 40 through low pressure test fluid conduit 100. When it is desired to subject the test fluid in pipe 40 to high levels of test pressure, hydrostatic fill valve 96 permits the entry of high pressure test fluid into pipe 40. High pressure test fluid conduit 104 delivers test fluid under high pressure to hydrostatic fill valve 96 as shown in FIGS. 2A, 3 and 4. Neither the connection of low pressure test fluid conduit 100 nor the connection of high pressure test fluid conduit 104 to the hydraulic system associated with the pipe testing apparatus 20 has been shown in FIGS. 2A, 3 and 4. The necessary connection of the hydrostatic fill valve 96 to the hydraulic system and the detailed operation of the hydraulic system will be discussed more fully below. It should be noted that a test fluid reservoir 106 is located within the front end section 32 of frame 22 as shown in FIGS. 2A and 2B. Test fluid reservoir 106 provides a source of test fluid for filling pipe 40 through hydrostatic fill valve 96 as previously described.

Turning now to the rear end section 34 of frame 22, one sees that rear end section 34 comprises two substantially parallel rear leg sections 42 and two substantially parallel rear auxiliary leg sections 46. As previously described, rear leg sections 42 are not fixedly connected to the rear end 28 of frame 22 but are slidably disposed within apertures (not shown) in rear end 28. Rear auxiliary leg sections 46 are fixedly connected to the rear end 28 of frame 22. As previously described, each rear leg section 42 is hollow and has the appropriate inner dimensions to receive its respective middle leg section 44. As shown in FIG. 2C, the middle leg sections 44 are secured within the rear leg sections 42 utilizing fastening pin 50 and reinforcing bolts 58 as previously described. As also shown in FIG. 2C, each rear auxiliary leg section 46 is hollow and has the appropriate inner dimensions to receive its respective auxiliary middle leg section 48. Each auxiliary movable leg section 48 rests within but is not fixedly connected to its respective rear auxiliary leg section 46.

As shown in FIGS. 2C and 2D, a movable carriage 108 is slidably mounted between and upon the two substantially parallel rear leg sections 42 of rear end section 34. The principal functions of movable carriage 108 are to support rear test plug 98 and its associated hydraulic system and to transmit the forces acting on rear test plug 98 during the testing process to the rear leg sections 42 of rear end section 34. Movable carriage 108 is fitted with carriage wheels 110 adapted to roll on a set of parallel carriage tracks 112 mounted upon rear leg sections 42. Movable carriage 108 may be moved longitudinally either forward or backward along rear leg sections 42 as carriage wheels 110 roll along carriage tracks 112. The mechanism for moving movable carriage 108 either backward or forward along carriage tracks 112 comprises a carriage motor 114 and a carriage chain 116. Carriage chain 116 is fixedly attached to the rear end 28 of frame 22 as shown in FIG. 2D and is fixedly attached to the front of rear end section 34 of frame 22 as shown in FIG. 2C. Between the two points of attachment, carriage chain 116 is threaded through carriage motor 114 as shown in FIG. 2C. Carriage motor 114 is bi-directional in operation. That is, when carriage motor 114 causes carriage motor drive gear 118 to rotate in the forward direction, movable carriage 108 will move backwards along fixed carriage chain 116. Similarly, when carriage motor 114 causes carriage motor drive gear 118 to rotate in a backwards direction, then movable carriage 108 will move forward along carriage chain 116.

Figure 7:
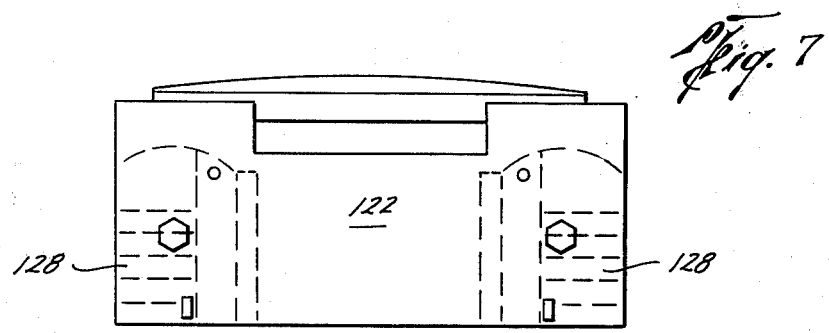
FIG. 7 is a top view of a portion of the locking mechanism shown in FIG. 6 taken on line 7—7 of FIG. 6 showing the surface area of locking engagement between said movable carriage and said apparatus.

After movable carriage 108 has been moved into the desired position by carriage motor 114 and carriage chain 116, then movable carriage 108 is locked into position with respect to the rear end section 34 of frame 22 with a hydraulically operated pawl and ratchet mechanism. As shown in FIGS. 2C, 2D, 6 and 7, two parallel carriage ratchets 120 are longitudinally disposed and affixed substantially parallel to the axis of frame 22 immediately adjacent to rear leg sections 42. As shown in FIGS. 2D, 6 and 7, a pivotally mounted locking plate 122 having pawl elements 124 complementarily shaped to the teeth of carriage ratchets 120 may be lowered into locking engagement under the action of hydraulic cylinders 126. FIG. 7 shows in shaded outline the surface area 128 of contact between the pawl elements 124 of locking plate 122 and the teeth of carriage ratchets 120.

Movable carriage 108 is locked into position as described with the threaded male end of test plug 98 resting inside the threaded portion of the female end of pipe 40. Rear test plug motors 130 are provided to rotate test plug 98 in either a clockwise or counterclockwise direction. Rear test plug motors 130 may rotate rear test plug 98 via a conventional gear driven drive chain 132 (shown in dotted outline). In preparing pipe 40 to be tested, rear test plug motors 130 cause rotatably mounted rear test plug 98 to be rotated until the female end of pipe 40 is threaded onto the complementarily shaped threaded male portion of rear test plug 98. After the testing process has been completed, rear test plug motors 130 reverse direction to cause rear test plug 98 to be rotated in the opposite direction, thereby uncoupling pipe 40 from its threaded connection.

Rear test plug 98 is mounted upon rear test plug back plate 134 as shown in FIG. 2D. Located immediately behind rear test plug back plate 134 is compression cylinder piston 136 of compression cylinder 138. As will be described more fully below, compression cylinder piston 136 is adapted to seat against rear test plug back plate 134 to receive and transmit to compression cylinder 138 the forces acting on rear test plug 98 and rear test plug back plate 134.

Compression cylinder 138 is fixedly connected to movable carriage 108. In contradistinction, it has been found necessary to mount rear test plug 98 and rear test plug back plate 134 so that they are longitudinally movable with respect to movable carriage 108. This feature permits pipe 40 to expand longitudinally during the testing process and thereby urge rear test plug 98 and rear test plug back plate 134 back along with compression cylinder piston 136 while compression cylinder piston 136 is holding a relatively constant load on the rear test plug back plate 134.

It may be readily seen that if rear test plug 98 and rear test plug back plate 134 were fixedly connected to movable carriage 108, any force experienced by rear test plug 98 and rear test plug back plate 134 would be transmitted directly to movable carriage 108 rather than being transmitted to compression cylinder piston 136 of compression cylinder 138. Accordingly, rear test plug 98 and rear test plug back plate 134 are fixedly mounted upon a rear test plug carriage 140 as shown in FIG. 2D. Rear test plug carriage 140 is similar to movable carriage 108 in construction and operation in that rear test plug carriage 140 possesses rear test plug carriage wheels 142 (shown in outline in FIG. 2D) adapted to roll upon carriage tack 112 (also shown in dotted outline in FIG. 2D).

After the female end of pipe 40 has been securely threaded onto the male end of test plug 98, rear test plug carriage 140 will have moved forward slightly from the position it occupied before the joint between pipe 40 and rear test plug 98 was made up. Thus, a slight space or gap will exist between the rear surface of rear test plug back plate 134 and compression cylinder piston 136.

As will be described more fully below, the hydraulic system of the apparatus permits hydrostatic test fluid to be introduced into the rear portion of the interior of compression cylinder 138. The end of compression cylinder piston 136 within compression cylinder 138 is formed having a portion defining a compression cylinder piston flange 146 as shown in FIG. 2D. The interior of compression cylinder 138 is divided by compression cylinder piston flange 146 into two chambers, a compression cylinder back chamber 148 and a compression cylinder front chamber 150. Compression cylinder back chamber 148 includes the space within compression cylinder 138 between compression cylinder piston flange 146 and the rear wall of compression cylinder 138. Compression cylinder front chamber 150 includes the space within compression cylinder 138 between compression cylinder piston flange 146 and the front wall of compression cylinder 138. As shown in FIG. 2D, compression cylinder piston 136 extends through the front wall of compression cylinder 138 so that it may be hydraulically adjusted to be urged into contact with the rear surface of rear test plug back plate 134. Compression cylinder piston flange 146 fits within the interior of compression cylinder 138 at such close tolerance that there is no internal fluid communication between compression cylinder back chamber 148 and compression cylinder front chamber 150. Thus, compression cylinder piston 136 may be moved either backward or forward within compression cylinder 138 by adjusting the level of hydrostatic pressure within compression cylinder back chamber 148 and compression cylinder front chamber 150. For the reasons described below, compression cylinder piston 136 is moved into position against rear test plug back plate 134 immediately prior to the high pressure testing of pipe 40 in order to close the slight space or gap between the rear surface of rear test plug back plate 134 and compression cylinder 136.

After pipe 40 has been threaded into front test plug 88 and onto rear test plug 98 and after compression cylinder piston 136 has been positioned in abutting contact with rear test plug back plate 134 as described above, pipe 40 is filled with hydrostatic test fluid. In order that pipe 40 may be completely filled with hydrostatic test fluid, it is necessary to vent the air that is present within the interior of pipe 40. The air is vented through rear test plug 98 and through rear test plug back plate 134 as will now be described.

As shown in FIG. 10, the portion of rear test plug back plate 134 which faces the interior of pipe 40 when pipe 40 is threaded onto rear test plug 98 is formed having a plurality of air vent holes 152. Also as shown in FIG. 10, each group of rear test plug back plate air vent holes 152 are located in a straight line extending radially outward from the center of circularly shaped rear test plug back plate 134. As shown in FIGS. 10 and 11, each group of rear test plug back plate air vent holes 152 are connected with a rear test plug back plate air vent channel 154 located within rear test plug back plate 134. Air that is vented from the interior of pipe 40 as pipe 40 is filled with test fluid flows through the rear test plug back plate air vent holes 152 and through rear test plug back plate air vent channels 154 to air bleed valves 156. The construction of each of the air bleed valves 156 is shown in detail in FIG. 8.

A plurality of air vent channel plugs 166 seal the apertures in the side of rear test plug back plate 134 formed when the rear test plug back plate air vent channels 154 were drilled connecting the rear test plug back plate air vent holes 152. In the preferred embodiment of the apparatus, air vent channel plugs 166 are threaded plugs and the apertures in the side of rear test plug back plate 134 are complementarily threaded to receive said threaded air vent channel plugs 166 so that said air vent channel plugs 166 may be removed to clean the rear test plug back plate air vent channels 154.

As shown in FIG. 10, the surface of rear test plug back plate 134 that faces the interior of pipe 40 is formed having a shallow recess adapted to receive a cylindrically symmetrical pipe size adaptor 158 to permit rear test plugs 98 of varying sizes to be mounted upon rear test plug back plate 134 in order to hydrostatically test different sizes of pipe. As shown in FIGS. 10 and 11, pipe size adapter 158 is formed having a plurality of pipe size adapter grooves 160 and pipe size adapter vent holes 162. Pipe size adapter vent holes 162 are located in pipe size adapter 158 so that they may be aligned with the underlying test plug back plate air vent holes 152 as shown in FIG. 11. Pipe size adapter grooves 160 are adapted to receive a complementarily shaped test plug adapter rim 164 on the end of rear test plug 98. As shown in FIG. 11, test plug adaptor rims 164 on rear test plugs 98 of varying sizes may be seated within pipe size adapter 158. This permits rear test plugs 98 of varying sizes to be used. A test plug retaining ring 165 of the appropriate size is used to hold the test plug 98 in position with respect to rear test plug back plate 134. O-rings 167 are provided to prevent the escape of test fluid between the juncture of the surfaces of pipe size adapter 158 and the surfaces of test plug 98. A similar test plug adapter and pipe size adapter assembly (not shown) exists to accomodate varing sizes of front test plugs 88. Air vent holes 152 are threaded to receive threaded air vent hole plugs (not shown) to seal exposed air vent holes 152 when smaller size test plugs 98 are used.

Figure 8:
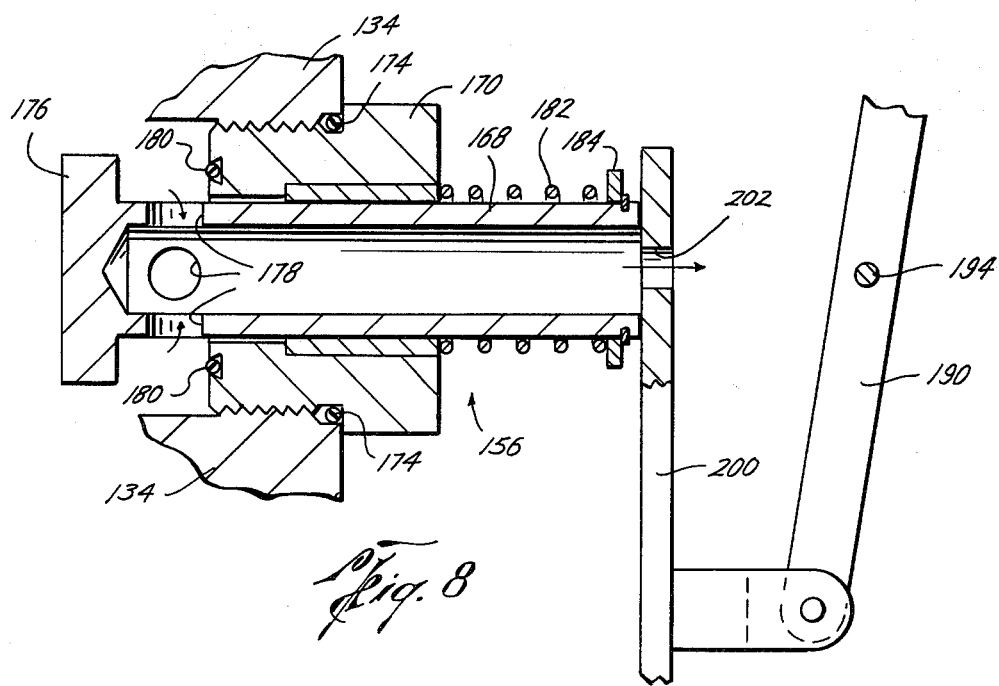
FIG. 8 is a detailed sectional view of an air bleed valve for permitting air to escape from the interior of the pipe when the pipe is being filled with test fluid.

Turning now to the details of the construction of air bleed valve 156 as shown in FIG. 8, one sees that air bleed valve 156 comprises a hollow air bleed valve sleeve 168 which is slidably disposed within an aperture in a threaded air bleed valve mounting 170 as shown in FIG. 8. Air bleed valve mounting 170 is securely threaded into an aperture in rear test plug back plate 134. An O-ring 174 prevents the escape of fluid between the threaded juncture of rear test plug back plate 134 and air bleed valve mounting 170. As shown in FIG. 8, an air bleed valve sleeve cap 176 closes the innermost end of air bleed valve sleeve 168. Air bleed valve sleeve ports 178 are located within air bleed valve sleeve 168 immediately behind air bleed valve sleeve cap 176 to permit air to flow into the hollow portion of air bleed valve sleeve 168 when air bleed valve 156 is in open position. When air bleed valve 156 is in closed position, air bleed valve sleeve cap 176 seats against the interior surface of air bleed valve mounting 170. An O-ring 180 prevents the flow of air and/or test fluid between the juncture of air bleed valve mounting 170 and air bleed valve sleeve cap 176 when air bleed valve 156 is in closed position. An air bleed valve spring 182 is held in place on air bleed valve sleeve 168 by an air bleed valve spring retainer 184. Air bleed valve spring 182 insures that air bleed valve 156 is always in closed position until an external force overcomes the tension of air bleed valve spring 182.

In the preferred embodiment of the apparatus, one or more of the air bleed valves 156 may be opened with a hydraulically operated air bleed valve control 186. As shown in FIGS. 2D, 8 and 9, said air bleed valve control 186 comprises a pivotally mounted arm 190 mounted on pivot 194 of housing 196. As shown in FIGS. 8 and 9, an air bleed valve pressure plate 200 pivotally connected to arm 190 may be urged against at least one of the air bleed valves 156 by arm 190 to overcome the tension of an air bleed valve spring 182 and thereby cause at least one air bleed valve 156 to be moved into open position. An air bleed valve pressure plate aperture 202 permits the air to be vented from the interior of air bleed valve sleeve 168.

As shown in FIGS. 2D, 10 and 11, the air bleed valves 156 are located at spaced intervals in a circular pattern on the rear surface of rear test plug back plate 134. The circular arrangement of air bleed valves 156 insures that at least one air bleed valve 156 will be in position near the top of rear test plug back plate 134 so that it may be opened by air bleed valve control 186. As shown in FIG. 2D, the air bleed valves 156 that are not positioned under air bleed valve pressure plate 200 of air bleed valve control 186 remain closed at all times.

As the interior of pipe 40 is completely filled with test fluid the air that had been within the interior of pipe 40 is permitted to escape through the air bleed valves 156 that have been opened by air bleed valve control 186. The appearance of test fluid flowing from the opened air bleed valves 156 indicates that the interior of pipe 40 has been completely filled with test fluid. At this point the operator of the apparatus actuates air bleed valve control 186 to cause air bleed valve pressure plate 200 to be retracted, thereby permitting the air bleed valve springs 182 to close the air bleed valves 156. At this point pipe 40 is completely filled with test fluid and is ready for hydrostatic testing.

Figure 14:
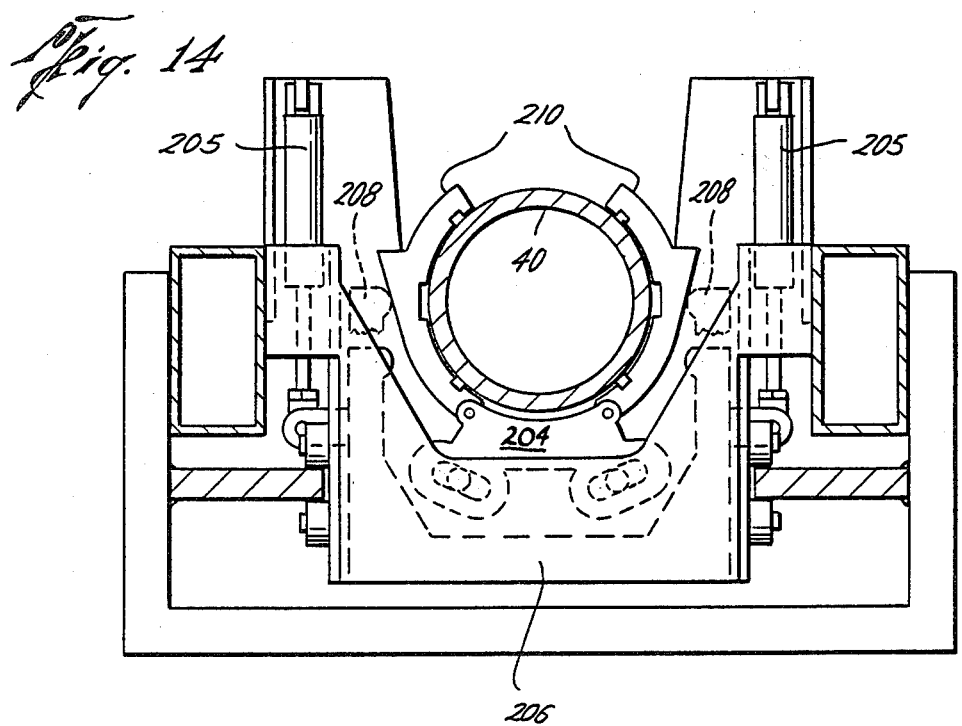
FIG. 14 is a partially sectional view of the apparatus taken along line 14—14 of FIG. 2B showing a vise for securing a pipe to the apparatus.

In order to provide additional restraints for keeping the pipe 40 securely within frame 22 during the testing process, a pipe-gripping vise or the like may be utilized. One version of a pipe vise 204 is depicted in FIGS. 2B and 14. The operation of pipe vise 204 may be briefly described as follows. A pair of hydraulic cylinders 205 lift a pipe vise yoke 206 having pipe vise yoke arms 208. Said pipe vise yoke arms 208 urge pivotally mounted pipe vise jaws 210 into gripping contact with pipe 40. Pipe vise 204 is internally constructed to oppose the rotation of pipe 40 in either a clockwise or counter-clockwise direction.

Turning now to the hydraulic system of the hydrostatic pipe testing apparatus, one sees that the hydraulic system is schematically depicted in FIGS. 15, 16 and 17. The compression cylinder, generally denoted by the numeral 138, is schematically shown as a unit of the hydraulic system. As previously described, compression cylinder piston 136 divides the interior of the compression cylinder 138 into two chambers, a compression cylinder back chamber 148 and a compression cylinder front chamber 150.

With reference to FIG. 15, the numeral 212 denotes a fluid source from which hydrostatic fluid such as water may be obtained to power the hydraulic system and to hydrostatically test the pipe. Pump 214 forces hydrostatic fluid through the various lines of the hydraulic system.

As previously described, before the pipe may be hydrostatically tested, it is necessary to position compression cylinder piston 136 within compression cylinder 138 in order to make the appropriate longitudinal adjustments necessary to compensate for the longitudinal thrusts of the rear test plug 98 against the rear test plug back plate 134 on the rear end section 34 of the frame 22. The hydraulic system is used to position piston 136 within compression cylinder 138 by moving piston 136 either backward or forward within compression cylinder 138 using hydrostatic test fluid under low pressure.

FIG. 15 schematically depicts the hydraulic system in a configuration for moving piston 136 of compression cylinder 138 backwards with respect to said compression cylinder 138. In operation, pump 214 pumps hydrostatic test fluid such as water from source 212 through fluid source line 216 to shift valve 218. In this configuration shift valve 218 is set to connect fluid source line 216 with low pressure line 220. In this configuration shift valve 218 also simultaneously connects high pressure line 222 with discharge line 224. The fluid in low pressure line 220 passes through a low pressure safety release valve 226. If the hydrostatic pressure within low pressure line 220 exceeds a certain maximum limit set within low pressure safety release valve 226, then said safety release valve 226 will open and discharge hydrostatic fluid from low pressure line 220, thereby releasing the increased pressure. Low pressure safety release valve 226 can thereby prevent damage to the hydraulic system if, for example, shaft valve 218 burst and permitted fluid under high pressure to flow from high pressure line 222 to low pressure line 220.

After the fluid in low pressure line 220 passes through low pressure safety release valve 226, it then passes through a low pressure regulator 228. The low pressure regulator 228 prevents the hydrostatic pressure in that portion of low pressure line 220 which extends beyond low pressure regulator 228 from exceeding a predetermined pressure level set within low pressure regulator 228. Typically, the values of input pressure to low pressure regulator 228 will be in the range of 120 psi to 150 psi. Low pressure regulator 228 is set to regulate the input pressure from low pressure line 220 so that the output pressure from low pressure regulator 228 may be maintained at any chosen pressure within a range of approximately 70 psi to 90 psi.

Assume, for example, that low pressure regulator 228 is set to regulate the input pressure it receives from low pressure line 220 to an output pressure of 80 psi. If low pressure regulator 228 receives an input pressure of less than 80 psi, then that lower pressure will be transmitted through low pressure regulator 228 to that portion of low pressure line 220 which extends beyond low pressure regulator 228. If low pressure regulator 228 receives an input pressure greater than 80 psi, say 100 psi, then only 80 psi of that pressure will be transmitted through low pressure regulator 228. The value of the input pressure in that portion of low pressure line 220 leading into low pressure regulator 228 remains at 100 psi.

A compression cylinder positioning gauge 230 measures the value of the pressure in low pressure line 220 as regulated by low pressure regulator 228. After the fluid in low pressure line 220 passes through low pressure regulator 228 it then enters a compression cylinder positioning valve 232. In this configuration the compression cylinder positioning valve 232 connects low pressure line 220 with front chamber line 234. Front chamber line 234 conducts the hydrostatic fluid to the front chamber 150 of compression cylinder 138. Simultaneously, compression cylinder positioning valve 232 connects back chamber line 236 with a discharge line 238. Because back chamber line 236 connects the back chamber 148 of the compression cylinder 138 to compression cylinder positioning valve 232, it is possible in this configuration for the fluid within back chamber 148 of compression cylinder 138 to be discharged through discharge line 238 as piston 136 moves backwards with respect to compression cylinder 138.

In summary, pump 214 pumps fluid through shift valve 218, through low pressure line 220, through low pressure safety release valve 226, through low pressure regulator 228, through compression cylinder positioning valve 232 and through front chamber line 234 to increase the fluid pressure in front chamber 150 of compression cylinder 138. Simultaneously, fluid is discharged from back chamber 148 of compression cylinder 138 through back chamber line 236 through compression cylinder positioning valve 232 and through discharge line 238. The pressure differential across piston 136 between front chamber 150 and back chamber 148 causes piston 136 to move backward with respect to compression cylinder 138.

A similar process is employed to cause piston 136 of compression cylinder 138 to move forward with respect to compression cylinder 138. FIG. 16 schematically depicts the hydraulic system in a configuration for using hydrostatic test fluid under low pressure to move piston 136 forward. Shift valve 218 is set in the same position as that previously indicated in FIG. 15 and described above. That is, fluid source line 216 is connected to low pressure line 220. The remainder of the hydraulic system configuration is also the same as that previously described except for compression cylinder positioning valve 232. In this configuration compression cylinder positioning valve 232 now connects low pressure line 220 with back chamber line 236 and now connects front chamber line 234 with discharge line 238. Fluid under pressure from pump 214 now passes through fluid source line 216, through shift valve 218, through low pressure safety release valve 226, through low pressure regulator 228, through compression cylinder positioning valve 232 and through back chamber line 236 into back chamber 148 of compression cylinder 138. Fluid within front chamber 150 of compression cylinder 138 now flows through front chamber line 234, through compression cylinder positioning valve 232, and through discharge line 238. The pressure differential across piston 136 between back chamber 148 of compression cylinder 138 and front chamber 150 of compression cylinder 138 causes piston 136 to move forward with respect to compression cylinder 138.

Once piston 136 is properly positioned, the hydraulic system is configured to test the pipe 40 under high pressure conditions. First, compression cylinder positioning valve 232 is moved to a neutral position as shown in FIG. 17. In neutral position, compression cylinder positioning valve 232 seals all four ports of the valve, thereby preventing any fluid communication between the lines entering or leaving the valve. Specifically, the hydrostatic fluid within front chamber line 134 and back chamber line 236 cannot escape through compression cylinder positioning valve 232. This insures that piston 136 will not move from its adjusted position due to the outflow of hydrostatic fluid from either front chamber line 234 or back chamber line 236 through compression cylinder positioning valve 232. As will be explained more fully below, the fluid pressure in back chamber pressure release line 240 which connects with back chamber line 236 at juncture 242 will be at the same pressure level as the fluid pressure in back chamber line 236. This will prevent the fluid in back chamber line 236 from uncontrollably flowing out through back chamber pressure release line 240.

A compression cylinder low pressure gauge 244 is connected to back pressure chamber release line 240 to measure the low pressures in back chamber 148 of compression cylinder 138 when compression cylinder positioning valve is in a neutral position as shown in FIG. 17. Compression cylinder low pressure gauge 244 reads the fluid pressure in back chamber 148 before and during the high pressure testing. During high pressure testing, an automatic shutoff safety valve 246 protects compression cylinder low pressure gauge 244 from the elevated pressure levels that can appear in back chamber pressure release line 240 if the pressure exceeds a certain pressure level (e.g., when a test plug blows out of the end of the pipe or when the regulators are set above a certain pressure level). Specifically, automatic shutoff safety valve 246 automatically closes when the fluid pressure in back chamber pressure release line 240 reaches approximately 550 psi.

Once piston 136 has been stabilized by moving compression cylinder positioning valve 232 into a neutral position, shift valve 218 is set in the configuration shown in FIG. 17. Specifically, shift valve 218 in this configuration connects low pressure line 220 with discharge line 224 and connects fluid source line 216 with high pressure line 222. After shift valve 218 is moved into this configuration, the fluid in low pressure line 220 empties into discharge line 224 thereby draining low pressure line 220 back to compression cylinder positioning valve 232. Pump 214 now forces the fluid through fluid source line 216, through shift valve 218 and through high pressure line 222. The pipe 40 is filled with hydrostatic test fluid through high pressure pipe fill line 248 which is connected to high pressure line 222. A pipe bleed-off valve 250 in high pressure pipe fill line 248 regulates the admission of high fluid pressure to pipe 40. When pipe 40 is being filled with fluid or is being subjected to high pressure testing, pipe bleed-off valve 250 is open. Closing pipe bleed-off valve 250 isolates pipe 40 from the source of high fluid pressure. It is desirable to isolate pipe 40 during the adjustment and testing of various high pressure regulators and valves in high pressure line 222 (the operation of which will be discussed more fully below) so that said regulators and valves may be adjusted and tested under high pressure conditions before pipe 40 is subjected to high pressure testing.

A test pressure gauge 252 monitors the fluid pressure in high pressure line 222. When pipe bleed-off valve 250 is open, test pressure gauge 252 measures the amount of fluid pressure within pipe 40. As shown in FIG. 17, a high pressure actuator 254 is placed in parallel with a low pressure actuator 256 in high pressure line 222. Shutoff valves 258a, 258b and 258c permit either high pressure actuator 254 or low pressure actuator 256 to be isolated from the fluid flow through high pressure line 222. Specifically, one may isolate low pressure actuator 256 from the fluid flow by closing shutoff valves 258a and 258b and by opening shutoff valve 258c behind high pressure actuator 254. The hydrostatic test fluid in high pressure line 222 will be transmitted through high pressure actuator 254 only if the hydrostatic fluid pressure in high pressure line 222 reaches the predetermined pressure level at which high pressure actuator 254 is set to open. Various high pressure actuators have differing ranges of pressure at which they may be set to allow fluid to be transmitted. An average range might be from 6,000 psi up to 15,000 psi. A high pressure actuator having this pressure range could be set to open at any particular pressure within the pressure range, including a pressure as low as 6,000 psi and including a pressure as high as 15,000 psi.

It is possible to isolate high pressure actuator 254 from the hydraulic system by closing shutoff valve 258c and by opening shutoff valves 258a and 258b. In this case, the hydrostatic fluid in high pressure line 222 may be transmitted only through low pressure actuator 256. Various low pressure actuators also have differing ranges of fluid pressures at which they may be set to transmit fluid. An average range might be from 400 psi up to 8,000 psi. A low pressure actuator having this pressure range could be set to open at any particular pressure within the pressure range, including a pressure as low as 400 psi and including a pressure as high as 8,000 psi. Although high pressure actuator 254 and low pressure actuator 256 overlap slightly in the range of pressures which each will transmit, only one of the actuators, 254 or 256, will be open during normal operations. That is, shutoff valves 258a, 258b and 258c will not all be open at the same time. Therefore, if one wished to set an actuator to open upon a pressure of 7,000 psi, one would connect either low pressure actuator 256 or high pressure actuator 254, but not both.

By opening or closing the appropriate shutoff valves 258a, 258b, or 258c and by setting the value of pressure to be transmitted by the actuator, 254 or 256, which is connected to high pressure line 222, one may regulate the pressure at which the connected actuator will open. For example, if high pressure actuator 254 is isolated by closing shutoff valve 258c and low pressure actuator 256 is connected by opening shutoff valves 258a and 258b, then the minimum fluid pressure which the hydraulic system can be set to transmit beyond low pressure actuator 256 will be approximately 400 psi. If it is contemplated that the fluid pressure to be transmitted will exceed the maximum limit of the low pressure actuator 256 (approximately 8,000 psi), then low pressure actuator 256 should be isolated from high pressure line 222 and high pressure actuator 254 should be used in its place.

If low pressure actuator 256 is isolated from the hydraulic system by closing shutoff valves 258a and 258b, then the minimum pressure for which high pressure actuator 254 may be set to open will be approximately 6,000 psi. If the test pressure in high pressure line 222 is equal to or greater than the pressure for which high pressure actuator 254 is set to open, then the test pressure will be transmitted to that portion of high pressure line 222 extending beyond the actuators 254 and 256. If the test pressure in high pressure line 222 is less than the pressure for which high pressure actuator 254 is set to open, then no fluid will be transmitted through high pressure actuator 254.

As shown in FIG. 17, a high pressure regulator 260 is located in series in high pressure line 222 beyond actuators 254 and 256. High pressure regulator 260 operates on the same principle as does low pressure regulator 228 but operates at higher pressures. Specifically, high pressure regulator 260 prevents the hydrostatic pressure in that portion of high pressure line 222 which extends beyond high pressure regulator 260 from exceeding a predetermined pressure level set within high pressure regulator 260. Typically, the values of input pressure to high pressure regulator 260 will be in the range of 400 psi up to 15,000 psi. High pressure regulator 260 is set to regulate the input pressure from high pressure line 222 so that the output pressure from high pressure regulator 260 may be maintained at any chosen pressure within a range of approximately 400 psi to 10,000 psi.

Assume, for example, that high pressure regulator 260 is set to regulate the input pressures it receives from high pressure line 222 to an output pressure of 7,000 psi. If high pressure regulator 260 receives an input pressure of less than 7,000 psi, then that lower pressure will be transmitted through high pressure regulator 260 to that portion of high pressure line 222 which extends beyond high pressure regulator 260. If high pressure regulator 260 receives an input pressure greater than 7,000 psi, say 9,000 psi, then only 7,000 psi of that pressure will be transmitted through high pressure regulator 260. The value of input pressure in that portion of high pressure line 222 leading into high pressure regulator 260 remains at 9,000 psi.

As shown in FIG. 17, a medium pressure regulator 262 may be connected in series in high pressure line 222 beyond high pressure regulator 260. The fluid flow through high pressure line 222 may be channeled through medium pressure regulator 262 by opening shutoff valves 264a and 264b and by closing shutoff valve 264c. Because the explanation of the operation of medium pressure regulator 262 may be made more clear by first describing the operation of the hydraulic system utilizing high pressure regulator 260 alone, assume that shutoff valves 264a and 264b are closed and that shutoff valve 264c is open, thereby isolating the medium pressure regulator 262 from high pressure line 222. In operation, either both shutoff valves 264a and 264b are open and shutoff valve 264c is closed or both shutoff valves 264a and 264b are closed and shutoff valve 264c is open. At no time are shutoff valves 264a, 264b and 264c either all open or all closed.

If the medium pressure regulator 262 is isolated from high pressure line 222, then the fluid output from high pressure regulator 260 flows through open shutoff valve 264c to a throttle valve 266. A compression cylinder high pressure gauge 268 reads the level of fluid pressure in high pressure line 222 immediately after high pressure line 222 exits throttle valve 266. Compression cylinder high pressure gauge 268 measures the level of fluid pressure in the back chamber 148 of compression cylinder 138. That is, the fluid pressure is the same in back chamber 148, in back chamber line 236, in back chamber pressure release line 240, and in that portion of high pressure line 222 between high pressure regulator 260 and throttle valve 266. As previously noted, automatic shutoff safety valve 246 protects compression cylinder low pressure gauge 244 when the fluid pressure in back chamber pressure release line 240 exceeds approximately 550 psi.

For purposes of example, assume that the high pressure actuator 254 shown in FIG. 17 has been connected in high pressure line 222 and has been set to open at 6,000 psi. Further assume that high pressure regulator 260 has been set to regulate output pressure to 8,000 psi and that medium pressure regulator 262 has been isolated from high pressure line 222 as previously described.

After the pipe 40 has been filled with test fluid under low pressure, pipe bleed-off valve 250 in high pressure pipe fill line 248 is opened to subject the test fluid in pipe 40 to high levels of fluid pressure created by pump 214. When the test pressure in pipe 40 and in high pressure line 222 as measured by test pressure gauge 252 reaches 6,000 psi, high pressure actuator 254 opens to transmit the fluid pressure to high pressure regulator 260. Because 6,000 psi is less than the fluid pressure level for which high pressure regulator 260 is set, high pressure regulator 260 transmits 6,000 psi to back chamber 148 of compression cylinder 138 via back chamber pressure release line 240 and back chamber line 236. Piston 136 of compression cylinder 138 is thus instantaneously urged against rear test plug back plate 134 with a pressure of 6,000 psi as soon as high pressure actuator 254 opens. The 6,000 psi of pressure in compression cylinder 138 provides a balancing pressure to counter the test pressure within pipe 40.

As the test pressure is increased from 6,000 psi the pressure within back chamber 148 of pressure cylinder 138 increases a like amount up to 8,000 psi. At the 8,000 psi level, high pressure regulator 260 begins to regulate the pressure transmitted to back chamber 148 of compression cylinder 138 limiting the pressure so transmitted to 8,000 psi. Thus, when the test pressure in pipe 40 is 12,000 psi, then high pressure actuator 254 is transmitting 12,000 psi to high pressure regulator 260 (the upper limit for high pressure actuator 254 is about 15,000 psi). High pressure regulator 260, however, is transmitting only 8,000 psi to the back chamber 148 of compression cylinder 138. Thus, the effective pressure difference that the two test plugs, 88 and 98, must contain is only 4,000 psi when the test pressure in the pipe stands at 12,000 psi. Of course, other values of pressure may be chosen in regulating the hydraulic system. The example is illustrative only.

If either of the two test plugs, 88 or 98, begin to fail, the test pressure in pipe 40 would begin to be transmitted via piston 136 to the fluid contained within back chamber 148 of compression cylinder 138. In this example, as the level of fluid pressure in back chamber 148 increased above 8,000 psi, high pressure regulator 260 would bleed off the increased levels of pressure by venting hydrostatic fluid out of high pressure line 222 through a release valve (not shown) within high pressure regulator 260. Piston 136 would then move toward the back of compression cylinder 138 has hydrostatic fluid exited back chamber 148 through back chamber line 236 to be vented through high pressure regulator 260. As piston 136 moved back with respect to its previous location, then whichever test plug, 88 or 98, was failing to hold pressure within the pipe 40 would move outwardly with respect to pipe 40.

Throttle valve 266 is set to permit only a specific volume of fluid to flow from back chamber pressure release line 240 to high pressure line 222 at any one time. The particular volume of fluid that throttle valve 266 is designed to pass during a given time period is chosen by determining the rate at which one desires the test plug to be forced out of the end of the pipe. The effect of designing the throttle valve 266 in this manner is to control the rate at which a test plug may be forced from the end of a pipe during a high pressure test failure. The throttling action of throttling valve 266 insures that a test plug will be "stepped out" of the pipe a thread at a time rather than be forced out in a continuous and uncontrolled motion.

In practice it has been found that it is not necessary to keep the pressure levels in back chamber 148 of compression cylinder 138 at or near the test pressure level in pipe 40 in order to effectively prevent high pressure test failures. The test plugs in the ends of the pipe generally contain the test pressure within the pipe by virtue of being properly threaded into or onto the pipe. Thus, the pressure in back chamber 148 used to counterbalance the test pressure in the pipe 40 may be as low as 100 psi. As long as this amount of pressure is externally applied to the test plugs sealing the pipe, a suitable pressure "buffer" will be maintained for controlling any high pressure test failures that might occur.

Medium pressure regulator 262 gives the system the capability of reducing the pressure level in back chamber 148 of compression cylinder 138 to pressure levels less than 2,000 psi. If the desired pressure level in back chamber 148 is greater than 2,000 psi then medium pressure regulator 262 will be isolated from high pressure line 222 as previously described. Although the pressure levels which may be transmitted to back chamber 148 of compression cylinder 138 using only high pressure regulator 260 may be lower than 2,000 psi, there is an estimated five percent (5%) error in the readings in high pressure regulator 260 when the output pressure is less than 2,000 psi. The use of medium pressure regulator 262 permits more accurate measurement of pressures less than 2,000 psi. Thus, medium pressure regulator 262 may be used to "fine tune" the amount of pressure applied to back chamber 148.

In operation, medium pressure regulator 262 is connected to high pressure line 222 by opening shutoff valves 264a and 264b and by closing shutoff valve 264c. Assume for purposes of example that medium pressure regulator 262 regulates the output pressure to 1,000 psi. Also assume as in the example noted above that high pressure actuator 254 is set to open at 6,000 psi and that high pressure regulator 260 regulates its output pressure to 8,000 psi. As before, when the test pressure in pipe 40 and in high pressure line 222 reaches 6,000 psi, high pressure actuator 254 opens to transmit the fluid pressure to high pressure regulator 260. High pressure regulator 260, being set to regulate pressure to 8,000 psi transmits the 6,000 psi of pressure to medium pressure regulator 262. Medium pressure regulator 262 regulates its output pressure to 1,000 psi.

When the test pressure in pipe 40 and in high pressure line 222 reaches 8,000 psi, high pressure regulator 260 begins to regulate its output pressure to 8,000 psi, the 8,000 psi of pressure is then input into medium pressure regulator 262 where it is then again regulated down to 1,000 psi.

The advantage of using a high pressure regulator in conjunction with a medium pressure regulator may be illustrated by considering the example of a test pressure of 12,000 psi. When 12,000 psi is input into high pressure regulator 260 it is then regulated down to 8,000 psi for input into medium pressure regulator 262. Because medium pressure regulator 262 has a rated maximum of 10,000 psi input, it should not be used to regulate an input pressure of 12,000 psi down to 1,000 psi. Thus it becomes necessary to provide a high pressure regulator to "step-down" the pressure to a level that a medium pressure regulator could handle.

As before, if either of the test plugs, 88 or 98, begins to fail, the end loads on pipe 40 would be transmitted by a piston 136 to the fluid contained within back chamber 148 of compression cylinder 138. In this example, as the level of fluid pressure in back chamber 148 increased above 1,000 psi, medium pressure regulator 262 would bleed-off the increased levels of pressure by venting hydrostatic fluid out of high pressure line 222 through a release valve (not shown) within medium pressure regulator 262. Throttle valve 266 would operate as described above to control the rate at which the failing test plug, 88 or 98, would move out of the end of the pipe 40.

Pressure regulators 260 and 262 also enable the hydrostatic pipe testing apparatus to compensate for any additional pressure created by the longitudinal expansion of the pipe 40 during the testing process. In the example, any increase in pressure on piston 136 due to longitudinal expansion of pipe 40 would be transmitted to the fluid in back chamber 148 and bled off through medium pressure regulator 262 to maintain 1,000 psi in back chamber 148. Venting such additional pressure in this manner enables the pipe 40 to be tested under conditions which more closely simulate the natural conditions under which pipe is generally used. Thus, artificially induced tension and stress points in the walls of the pipe due to the longitudinal expansion of the pipe during the testing process can be avoided. In this manner the pipe may be tested under conditions which more accurately simulate the tension and stress points the pipe would experience in a well.

Specifically, one can utilize the apparatus and method of the invention to subject the pipe to an amount of tension during the testing process that is equal to the amount of tension on the pipe due to the internal test pressure within the pipe less the amount of back-up force exerted on the sealed end of the pipe by the compression cylinder. By varying the amount of back-up force exerted by the compression cylinder, one can vary the amount of tension the pipe experiences during testing to more accurately simulate actual well bore environment. Because the burst capacity of a pipe may be affected by the amount of tension on the pipe in the well bore environment, the ability to vary the amount of tension on the pipe during testing enables one to more accurately estimate the burst capacity of a particular pipe.

If the back-up force exerted on the pipe by the compression cylinder exceeds the amount of tension on the pipe due to the internal test pressure within the pipe, the pipe may experience net compressive forces during the testing process. Because the burst capacity of a pipe may be affected by the amount of compressive force on the pipe in the well bore environment, the ability to place the pipe in compression during testing and the ability to vary the amount of compressive force on the pipe during testing enables one to more accurately estimate the burst capacity of a particular pipe.

Similarly, any other characteristics of a pipe that vary in response to tension on the pipe or compression on the pipe in a well bore environment may be investigated using the apparatus and method of the invention to simulate said tension or compression during the testing process.

The apparatus and method of the invention may also be used to test plain end pipe. Although the description of the preferred embodiment of the invention has been directed to the more commonly encountered threaded pipe, the description remains equally valid for the case of plan end pipe if the threaded test plugs, 88 and 98, are replaced with test plugs (not shown) adapted to sealingly engage plain end pipe.

What is claimed is:
1. An improved testing apparatus for hydrostatically testing threaded pipe of the type having
   a frame for containing a threaded pipe;
   a first threaded test plug rotatably mounted on said frame having a threaded portion in the form of the male end of a threaded pipe for threadably sealing the female end of a threaded pipe contained within said frame;
   a second threaded test plug rotatably mounted on said frame having a threaded portion in the form of the female end of a threaded pipe for threadably sealing the male end of a threaded pipe contained within said frame;
   means for introducing test fluid into the interior of said threaded pipe through at least one of the rotatably mounted test plugs sealing the ends of said threaded pipe contained within said frame;
   means for containing test fluid within the interior of said threaded pipe;
   means for subjecting said test fluid inside said threaded pipe to hydrostatic pressure;
   a compression cylinder mounted on said frame having a longitudinally movable compression cylinder piston slidably disposed within said compression cylinder for abutting one of the sealed ends of said threaded pipe; and
   a conduit for transmitting said hydrostatic pressure from the test fluid in said threaded pipe to a back chamber of said compression cylinder to urge said compression cylinder piston into contact with said sealed end of said threaded pipe to transmit force from said compression cylinder to the sealed ends of said threaded pipe;
   wherein the improvement comprises
   means for initiating the transmission of hydrostatic pressure to the back chamber of said compression cylinder when a specific pre-selected value of hydrostatic pressure is exceeded in the test fluid inside said threaded pipe.

2. An improved testing apparatus as claimed in claim 2 wherein said means for initiating the transmission of hydrostatic pressure to the back chamber of said compression cylinder when a specific pre-selected value of hydrostatic pressure is exceeded in the test fluid inside said threaded pipe comprises
   a pressure actuator in said conduit for transmitting said hydrostatic pressure from the test fluid in said threaded pipe to said back chamber of said compression cylinder, said pressure actuator having an input pressure range that includes the specific pre-selected value of hydrostatic pressure for the test pressure in said threaded pipe.

3. An improved testing apparatus for hydrostatically testing threaded pipe of the type having
   a frame for containing a threaded pipe;
   a first threaded test plug rotatably mounted on said frame having a threaded portion in the form of the male end of a threaded pipe for threadably sealing the female end of a threaded pipe contained within said frame;
   a second threaded test plug rotatably mounted on said frame having a threaded portion in the form of the female end of a threaded pipe for threadably sealing the male end of a threaded pipe contained within said frame;
   means for introducing test fluid into the interior of said threaded pipe through at least one of the rotatably mounted test plugs sealing the ends of said threaded pipe contained within said frame;
   means for containing test fluid within the interior of said threaded pipe;
   means for subjecting said test fluid inside said threaded pipe to hydrostatic pressure;
   a compression cylinder mounted on said frame having a longitudinally movable compression cylinder piston slidably disposed within said compression cylinder for abutting one of the sealed ends of said threaded pipe; and
   a conduit for transmitting said hydrostatic pressure from the test fluid in said threaded pipe to a back chamber of said compression cylinder to urge said compression cylinder piston into contact with said sealed end of said threaded pipe to transmit force from said compression cylinder to the sealed ends of said threaded pipe;

wherein the improvement comprises
means for regulating the transmission of hydrostatic pressure to the back chamber of said compression cylinder to cause the hydrostatic pressure in the back chamber of said compression cylinder to not exceed a specific pre-selected value of hydrostatic pressure.

4. An improved testing apparatus as claimed in claim 3 wherein said means for regulating the transmission of hydrostatic pressure to the back chamber of said compression cylinder comprises
a pressure regulator in said conduit for transmitting said hydrostatic pressure from the test fluid in said threaded pipe to said back chamber of said compression cylinder, said pressure regulator having an output pressure range that includes the specific pre-selected value of hydrostatic pressure for said back chamber of said compression cylinder.

5. An improved testing apparatus for hydrostatically testing threaded pipe of the type having
a frame for containing a threaded pipe;
a first threaded test plug rotatably mounted on said frame having a threaded portion in the form of the male end of a threaded pipe for threadably sealing the female end of a threaded pipe contained within said frame;
a second threaded test plug rotatably mounted on said frame having a threaded portion in the form of the female end of a threaded pipe for threadably sealing the male end of a threaded pipe contained within said frame;
means for introducing test fluid into the interior of said threaded pipe through at least one of the rotatably mounted test plugs sealing the ends of said threaded pipe contained within said frame;
means for containing test fluid within the interior of said threaded pipe;
means for subjecting said test fluid inside said threaded pipe to hydrostatic pressure;
a compression cylinder mounted on said frame having a longitudinally movable compression cylinder piston slidably disposed within said compression cylinder for abutting one of the sealed ends of said threaded pipe; and
a conduit for transmitting said hydrostatic pressure from the test fluid in said threaded pipe to a back chamber of said compression cylinder to urge said compression cylinder piston into contact with said sealed end of said threaded pipe to transmit force from said compression cylinder to the sealed ends of said threaded pipe;
wherein the improvement comprises
means for causing said compression cylinder piston to move back from said abutted sealed end of said threaded pipe when said sealed end of said threaded pipe moves out of said threaded pipe due to the hydrostatic pressure of the test fluid within said threaded pipe.

6. An improved testing apparatus as claimed in claim 5 wherein said means for causing said compression cylinder piston to move back from said abutted sealed end of said threaded pipe when said sealed end of said threaded pipe moves out of said threaded pipe due to the hydrostatic pressure of the test fluid within said threaded pipe comprises
a pressure regulator in said conduit for transmitting said hydrostatic pressure from the test fluid in said threaded pipe to said back chamber of said compression cylinder, said pressure regulator having an output pressure range that includes the value of hydrostatic pressure in said back chamber of said compression cylinder.

7. An improved testing apparatus for hydrostatically testing threaded pipe of the type having
a frame for containing a threaded pipe;
a first threaded test plug rotatably mounted on said frame having a threaded portion in the form of the male end of a threaded pipe for threadably sealing the female end of a threaded pipe contained within said frame;
a second threaded test plug rotatably mounted on said frame having a threaded portion in the form of the female end of a threaded pipe for threadably sealing the male end of a threaded pipe contained within said frame;
means for introducing test fluid into the interior of said threaded pipe through at least one of the rotatably mounted test plugs sealing the ends of said threaded pipe contained within said frame;
means for containing test fluid within the interior of said threaded pipe;
means for subjecting said test fluid inside said threaded pipe to hydrostatic pressure;
a compression cylinder mounted on said frame having a longitudinally movable compression cylinder piston slidably disposed within said compression cylinder for abutting one of the sealed ends of said threaded pipe; and
a conduit for transmitting said hydrostatic pressure from the test fluid in said threaded pipe to a back chamber of said compression cylinder to urge said compression cylinder piston into contact with said sealed end of said threaded pipe to transmit force from said compression cylinder to the sealed ends of said threaded pipe;
wherein the improvement comprises
means for causing said compression cylinder piston to move back from said abutted sealed end of said threaded pipe in response to pressure on said compression cylinder piston due to the movement of at least one of said sealed ends of said threaded pipe out of said threaded pipe due to the hydrostatic pressure of the test fluid within said threaded pipe having causing a thread failure of said threaded pipe.

8. An improved testing apparatus as claimed in claim 7 wherein said compression cylinder piston exerts approximately the same force on said sealed end of said threaded pipe after the movement of said sealed end of said threaded pipe occurs that compression cylinder piston exerted on said sealed end of said threaded pipe before the movement of said sealed end of said threaded pipe occurred.

9. An improved testing apparatus as claimed in claim 7 wherein said means for causing said compression cylinder piston to move back from said abutting sealed end of said threaded pipe in response to pressure on said compression cylinder piston due to the movement of at least one of said sealed ends of said threaded pipe out of said threaded pipe due to the hydrostatic pressure of the test fluid within said threaded pipe having caused a thread failure of said threaded pipe comprises
a pressure regulator in said conduit for transmitting said hydrostatic pressure from the test fluid in said threaded pipe to said back chamber of said compression cylinder, said pressure regulator having an output pressure range that includes the value of hydrostatic pressure for said back chamber of said compression cylinder.

10. An improved testing apparatus as claimed in claim 9 having a throttle valve in said conduit between said pressure regulator and said back chamber of said compression cylinder for regulating the flow of fluid from said back chamber of said compression cylinder to said pressure regulator.

11. An improved testing apparatus for hydrostatically testing threaded pipe of the type having a frame for containing a threaded pipe;

a first threaded test plug rotatably mounted on said frame having a threaded portion in the form of the male end of a threaded pipe for threadably sealing the female end of a threaded pipe contained within said frame;

a second threaded test plug rotatably mounted on said frame having a threaded portion in the form of the female end of a threaded pipe for threadably sealing the male end of a threaded pipe contained within said frame;

means for introducing test fluid into the interior of said threaded pipe through at least one of the rotatably mounted test plugs sealing the ends of said threaded pipe contained within said frame;

means for containing test fluid within the interior of said threaded pipe;

means for subjecting said test fluid inside said threaded pipe to hydrostatic pressure;

a compression cylinder mounted on said frame having a longitudinally movable compression cylinder piston slidably disposed within said compression cylinder for abutting one of the sealed ends of said threaded pipe; and a conduit for transmitting said hydrostatic pressure from the test fluid in said threaded pipe to a back chamber of said compression cylinder to urge said compression cylinder piston into contact with said sealed end of said threaded pipe to transmit force from said compression cylinder to the sealed ends of said threaded pipe;

wherein the improvement comprises means for causing said compression cylinder piston to move back from said abutted sealed end of said threaded pipe in response to pressure on said compression cylinder piston from an elongation of said threaded pipe to the hydrostatic pressure of the test fluid within said threaded pipe.

12. An improved testing apparatus as claimed in claim 11 wherein said compression cylinder piston exerts approximately the same force on the sealed end of said threaded pipe after the elongation of said threaded pipe occurs that said compression cylinder piston exerted on the sealed end of said threaded pipe before the elongation of said threaded pipe occurred.

13. An improved testing apparatus as claimed in claim 11 wherein said means for causing said compression cylinder piston to move back from said abutted sealed end of said threaded pipe in response to pressure on said compression cylinder piston from an elongation of said threaded pipe due to the hydrostatic pressure of the test fluid within said threaded pipe comprises a pressure regulator in said conduit for transmitting said hydrostatic pressure from the test fluid in said threaded pipe to said back chamber of said compression cylinder, said pressure regulator having an output pressure range that includes the value of hydrostatic pressure for said back chamber of said compression cylinder.

14. An improved testing apparatus as claimed in claim 13 having a throttle valve in said conduit between said pressure regulator and said back chamber of said compression cylinder for regulating the flow of fluid from said back chamber of said compression cylinder to said pressure regulator.

15. An improved testing apparatus for hydrostatically testing threaded pipe of the type having a frame for containing a threaded pipe;

a first threaded test plug rotatably mounted on said frame having a threaded portion in the form of the male end of a threaded pipe for threadably sealing the female end of a threaded pipe contained within said frame;

a second threaded test plug rotatably mounted on said frame having a threaded portion in the form of the female end of a threaded pipe for threadably sealing the male end of a threaded pipe contained within said frame;

means for introducing test fluid into the interior of said threaded pipe through at least one of the rotatably mounted test plugs sealing the ends of said threaded pipe contained within said frame;

means for containing test fluid within the interior of said threaded pipe;

means for subjecting said test fluid inside said threaded pipe to hydrostatic pressure;

a compression cylinder mounted on said frame having a longitudinally movable compression cylinder piston slidably disposed within said compression cylinder for abutting one of the sealed ends of said threaded pipe; and a conduit for transmitting said hydrostatic pressure from the test fluid in said threaded pipe to a back chamber of said compression cylinder to urge said compression cylinder piston into contact with said sealed end of said threaded pipe to transmit force from said compression cylinder to the sealed ends of said threaded pipe;

wherein the improvement comprises a pressure actuator in said conduit for transmitting said hydrostatic pressure from the test fluid in said threaded pipe to said back chamber of said compression cylinder; and a pressure regulator in said conduit for transmitting said hydrostatic pressure from the test fluid in said threaded pipe to said back chamber of said compression cylinder.

16. An improved testing apparatus as claimed in claim 15 having a throttle valve in said conduit between said pressure regulator and said back chamber of said compression cylinder for regulating the flow of fluid from said back chamber of said compression cylinder to said pressure regulator.

17. An improved method for hydrostatically testing threaded pipe of the type comprising the steps of containing a threaded pipe within a frame;

sealing the ends of said threaded pipe contained within said frame;

introducing test fluid into the interior of said threaded pipe through at least one of the sealed ends of said pipe;

containing test fluid within the interior of said threaded pipe;

subjecting said test fluid inside said threaded pipe to hydrostatic pressure;

abutting one of the sealed ends of said threaded pipe with a longitudinally movable compression cylinder piston slidably disposed within a compression cylinder; and transmitting hydrostatic pressure from the test fluid in said threaded pipe to a back chamber of said compression cylinder to urge said compression cylinder piston into contact with said sealed end of said threaded pipe to transmit force from said compression cylinder to the sealed ends of said threaded pipe;

wherein the improvement comprises initiating the transmission of hydrostatic pressure to the back chamber of said compression cylinder when a specific pre-selected value of hydrostatic pressure is exceeded in the test fluid inside said threaded pipe.

18. An improved method for hydrostatically testing pipe of the type comprising the steps of containing a threaded pipe within a frame;

sealing the ends of said threaded pipe contained within said frame;

introducing test fluid into the interior of said threaded pipe through at least one of the sealed ends of said pipe;

containing test fluid within the interior of said threaded pipe;

subjecting said test fluid inside said threaded pipe to hydrostatic pressure;

abutting one of the sealed ends of said threaded pipe with a longitudinally movable compression cylinder piston slidably disposed within a compression cylinder; and transmitting hydrostatic pressure from the test fluid in said threaded pipe to a back chamber of said compression cylinder to urge said compression cylinder piston into contact with said sealed end of said threaded pipe to transmit force from said compression cylinder to the sealed ends of said threaded pipe;

wherein the improvement comprises regulating the transmission of hydrostatic pressure to the back chamber of said compression cylinder to cause the hydrostatic pressure in the back chamber of said compression cylinder to not exceed a specific pre-selected value of hydrostatic pressure.

19. An improved method for hydrostatically testing pipe of the type comprising the steps of containing a threaded pipe within a frame;

sealing the ends of said threaded pipe contained within said frame;

introducing test fluid into the interior of said threaded pipe through at least one of the sealed ends of said pipe;

containing test fluid within the interior of said threaded pipe;

subjecting said test fluid inside said threaded pipe to hydrostatic pressure;

abutting one of the sealed ends of said threaded pipe with a longitudinally movable compression cylinder piston slidably disposed within a compression cylinder; and transmitting hydrostatic pressure from the test fluid in said threaded pipe to a back chamber of said compression cylinder to urge said compression cylinder piston into contact with said sealed end of said threaded pipe to transmit force from said compression cylinder to the sealed ends of said threaded pipe;

wherein the improvement comprises causing said compression cylinder piston to move back from said abutted sealed end of said threaded pipe when said sealed end of said threaded pipe moves out of said threaded pipe due to the hydrostatic pressure of the test fluid within said threaded pipe.

20. An improved method for hydrostatically testing pipe of the type comprising the steps of containing a threaded pipe within a frame;

sealing the ends of said threaded pipe contained within said frame;

introducing test fluid into the interior of said threaded pipe through at least one of the sealed ends of said pipe;

containing test fluid within the interior of said threaded pipe;

subjecting said test fluid inside said threaded pipe to hydrostatic pressure;

abutting one of the sealed ends of said threaded pipe with a longitudinally movable compression cylinder piston slidably disposed within a compression cylinder; and transmitting hydrostatic pressure from the test fluid in said threaded pipe to a back chamber of said compression cylinder to urge said compression cylinder piston into contact with said sealed end of said threaded pipe to transmit force from said compression cylinder to the sealed ends of said threaded pipe;

wherein the improvement comprises causing said compression cylinder piston to move back from said abutted sealed end of said threaded pipe in response to pressure on said compression cylinder piston due to the movement of at least one of said sealed ends of said threaded pipe out of said threaded pipe due to the hydrostatic pressure of the test fluid within said threaded pipe having caused a thread failure of said threaded pipe.

21. An improved method for hydrostatically testing pipe of the type comprising the steps of containing a threaded pipe within a frame;

sealing the ends of said threaded pipe contained within said frame;

introducing test fluid into the interior of said threaded pipe through at least one of the sealed ends of said pipe;

containing test fluid within the interior of said threaded pipe;

subjecting said test fluid inside said threaded pipe to hydrostatic pressure;

abutting one of the sealed ends of said threaded pipe with a longitudinally movable compression cylinder piston slidably disposed within a compression cylinder; and transmitting hydrostatic pressure from the test fluid in said threaded pipe to a back chamber of said compression cylinder to urge said compression cylinder piston into contact with said sealed end of said threaded pipe to transmit force from said compression cylinder to the sealed ends of said threaded pipe;

wherein the improvement comprises causing said compression cylinder piston to move back from said abutted sealed end of said threaded pipe in response to pressure on said compression cylinder piston from an elongation of said threaded pipe due to the hydrostatic pressure of the test fluid within said threaded pipe.

22. An improved method for hydrostatically testing pipe of the type comprising the steps of
   containing a threaded pipe within a frame;
   sealing the ends of said threaded pipe contained within said frame;
   introducing test fluid into the interior of said threaded pipe through at least one of the sealed ends of said pipe;
   containing test fluid within the interior of said threaded pipe;
   subjecting said test fluid inside said threaded pipe to hydrostatic pressure;
   abutting one of the sealed ends of said threaded pipe with a longitudinally movable compression cylinder piston slidably disposed within a compression cylinder; and
   transmitting hydrostatic pressure from the test fluid in said threaded pipe to a back chamber of said compression cylinder to urge said compression cylinder piston into contact with said sealed end of said threaded pipe to transmit force from said compression cylinder to the sealed ends of said threaded pipe;
   wherein the improvement comprises
   exerting a net tensile force on said threaded pipe during the hydrostatic testing of said pipe; and
   exerting a net compressive force on said threaded pipe immediately after the exertion of said net tensile force on said pipe by automatically regulating the transmission of hydrostatic pressure to the back chamber of said compression cylinder.

* * * * *